US012626538B2

(12) United States Patent
Schäfer et al.

(10) Patent No.: US 12,626,538 B2
(45) Date of Patent: May 12, 2026

(54) ASSET AND VEHICLE COUPLING

(71) Applicant: WEBFLEET SOLUTIONS B.V., Amsterdam (NL)

(72) Inventors: Jan Schäfer, Leipzig (DE); Jan Bast-Löffler, Leipzig (DE); Martin Marenz, Leipzig (DE); Christian Meissner, Leipzig (DE)

(73) Assignee: Bridgestone Mobility Solutions B.V., Amsterdam (NL)

( * ) Notice: Subject to any disclaimer, the term of this patent is extended or adjusted under 35 U.S.C. 154(b) by 307 days.

(21) Appl. No.: 17/223,325

(22) Filed: Apr. 6, 2021

(65) Prior Publication Data

US 2021/0312726 A1 Oct. 7, 2021

(30) Foreign Application Priority Data

Apr. 6, 2020 (EP) .................................... 20168121

(51) Int. Cl.
*G07C 5/00* (2006.01)
*G06Q 10/083* (2024.01)
(Continued)

(52) U.S. Cl.
CPC ......... *G07C 5/008* (2013.01); *G06Q 10/0833* (2013.01); *G06Q 10/0838* (2013.01); *G08G 1/20* (2013.01); *H04W 4/029* (2018.02)

(58) Field of Classification Search
CPC ........... G06Q 10/0833; G06Q 10/0838; G06Q 50/30; G07C 5/008; G08G 1/20;
(Continued)

(56) References Cited

U.S. PATENT DOCUMENTS 7,688,185 B1 3/2010 McKethan
9,689,698 B2 6/2017 Wesselius et al.
(Continued)

FOREIGN PATENT DOCUMENTS

EP 2700277 B1 7/2018
EP 3598359 A1 1/2020
WO WO-2006025669 A1 * 3/2006 .......... B61L 15/0054

OTHER PUBLICATIONS

Machine Translation of WO 2006025669 A1 obtained from Clarivate Analytics on Jun. 28, 2025 (Year: 2006).*
(Continued)

*Primary Examiner* — Fadey S. Jabr
*Assistant Examiner* — Michael J Herrera
(74) *Attorney, Agent, or Firm* — Patterson Intellectual Property Law, PC

(57) ABSTRACT

An asset tracking system comprises a server (6), one or more first telematics devices (8) each carried by an asset, and one or more second telematics devices (10) each carried by a vehicle capable of transporting an asset. The server (6) comprises a communications device arranged to communicate with the one or more first and second telematics devices (8,10). Each first telematics device (8) is configured to transmit asset travel data (12) to the server (6), and each second telematics device (10) is configured to transmit vehicle travel data (14) to the server (6). Each of the asset travel data (12) and vehicle travel data (14) comprise a plurality of data travel points each comprising a time stamp, position and a further motion-related parameter. The one or more first and second telematics devices (8,10) are each configured to communicate independently with the communications device of the server (6).

18 Claims, 11 Drawing Sheets

(51) Int. Cl.
| | |
|---|---|
| *G06Q 10/0833* | (2023.01) |
| *G08G 1/00* | (2006.01) |
| *H04W 4/029* | (2018.01) |

(58) Field of Classification Search
CPC ......... H04W 4/029; H04W 4/23; H04W 4/35; H04W 4/40
See application file for complete search history.

(56) References Cited

U.S. PATENT DOCUMENTS

| | | | | |
|---|---|---|---|---|
| 10,356,577 | B1 * | 7/2019 | Kugler | G08G 1/123 |
| 10,957,204 | B1 * | 3/2021 | Kumar | G08G 1/20 |
| 2005/0017899 | A1 * | 1/2005 | Cervinka | H04W 4/029 |
| | | | | 342/357.31 |
| 2005/0065711 | A1 * | 3/2005 | Dahlgren | G08G 1/096775 |
| | | | | 701/117 |
| 2008/0125964 | A1 * | 5/2008 | Carani | G08G 1/127 |
| | | | | 701/408 |
| 2010/0265061 | A1 | 10/2010 | Harmon et al. | |
| 2013/0147617 | A1 | 6/2013 | Boling et al. | |
| 2015/0148984 | A1 * | 5/2015 | Padulosi | B61L 25/028 |
| | | | | 701/1 |
| 2018/0365771 | A1 * | 12/2018 | Kilburn | G06Q 50/28 |
| 2019/0172008 | A1 * | 6/2019 | Hage | G01R 33/0206 |
| 2019/0184988 | A1 * | 6/2019 | Li | G05D 1/0257 |
| 2019/0311326 | A1 * | 10/2019 | Davidson | G06Q 10/08355 |
| 2020/0092683 | A1 * | 3/2020 | Fyfe | H04L 67/125 |

OTHER PUBLICATIONS

International Search Authority: Partial Search Report for co-pending patent application No. 20168121.0 dated Oct. 7, 2020, 12 pages.

International Search Authority: Extended Search report for co-pending application No. 20168121.0 dated Jan. 19, 2021, 12 pages.

* cited by examiner

ASSET AND VEHICLE COUPLING

TECHNICAL FIELD

The present invention relates to a method of determining a coupling between an asset and a vehicle, a telematics device associated with a moveable asset, a server for determining a coupling between an asset and a vehicle, and an asset tracking system.

BACKGROUND

It is known to use a telematics control unit (TCU) to track the positions of fleets of vehicles and assets associated with the vehicles. This enables a fleet owner to view the live position and movements of the complete fleet on a map, as well as a historical overview of the behaviour of all vehicles and assets. However, such remote tracking requires information to be provided about which assets and vehicles are coupled together. One common process is to manually maintain a list of which vehicle uses which asset. Another process is to have additional hardware on the TCUs, allowing for local communication between the TCU installed in the asset and the TCU installed in the vehicle. When the vehicle starts a trip, its TCU can scan which assets are within the local communication range. After driving for a while, the only assets within the local communication range should be the one which are physically coupled with that vehicle. However this is not reliable in all situations, for example when multiple vehicles and assets start out from the same depot or when multiple vehicles are following the same route in a convoy.

Current systems for remote fleet tracking are not able to determine with certainty which assets and vehicles are coupled together without the need for additional hardware installed on the vehicle or asset, or manual intervention. There remains a need for improved ways to remotely determine a coupling between an asset and a vehicle.

SUMMARY OF THE INVENTION

According to a first aspect of the present invention, there is provided a method of determining a coupling between an asset and a vehicle capable of transporting the asset, wherein the asset is carrying a first telematics device and the vehicle is carrying a second telematics device, the method comprising:

configuring the first telematics device to transmit asset travel data to a remote server at a first rate;

configuring the second telematics device to transmit vehicle travel data to the remote server at a second rate, the second rate being higher than the first rate;

the asset travel data and vehicle travel data comprising a plurality of travel data points, each travel data point comprising at least a time stamp and one or more travel parameters; and comparing one or more travel parameters of the asset travel data to one or more travel parameters of the vehicle travel data, at the remote server, to determine a coupling between the asset and the vehicle.

It will be appreciated that in this method the first and second telematics devices are configured to transmit travel data to the remote server at two different rates. In principle this provides a way for the server to distinguish between asset travel data and vehicle travel data, and possibly verify the source of incoming travel data, although usually the asset travel data is transmitted with an asset ID and the vehicle travel data is transmitted with a vehicle ID. A benefit of the first telematics device transmitting asset travel data to the server at a lower rate is that this device can be powered by a battery that will not need recharging during a typical journey, rather than relying on an external power supply (which may not even be available, depending on the type of asset e.g. a trailer or equipment transported by a trailer). The second telematics device may be installed on a vehicle with a connection to consume power from the onboard powertrain, and hence better able to support a higher rate of transmission for the vehicle travel data. The present invention realises that the server can still compare one or more travel parameters between the asset travel data and the vehicle travel data, to determine a coupling between the asset and the vehicle, despite the first and second rates being different.

In some embodiments the first rate may correspond to asset travel data being transmitted approximately once every 1 minute, 2 minutes, 3 minutes, 4 minutes, 5 minutes, 6 minutes, 7 minutes, 8 minutes, 9 minutes, or 10 minutes. In some embodiments the first rate may correspond to asset travel data being transmitted approximately once every 10 minutes, 15 minutes, 20 minutes, or more. In some embodiments the first rate may correspond to asset travel data being transmitted only once every hour on average.

In some embodiments the second rate may correspond to vehicle travel data being transmitted approximately once every 1 s, 2 s, 3 s, 4 s, 5 s, 6 s, 7 s, 8 s, 9 s, or 10 s at least. In some embodiments the second rate may correspond to vehicle travel data being transmitted approximately once every 10 s, 20 s, 30 s, 40 s, 50 s, or 60 s at least. In some embodiments the second rate may correspond to vehicle travel data being transmitted no more frequently than once every 1 s.

In at least some embodiments, the second telematics device is configured to transmit vehicle travel data to the remote server at a variable second rate. In some embodiments, the second rate is dynamically varied, for example in response to a driving event or driving environment. For instance, the second telematics device may be configured to transmit vehicle travel data to the remote server at a higher second rate when the vehicle travels round a bend as compared to the vehicle travelling in a straight line. In at least some embodiments, the method further comprises: configuring the second telematics device to dynamically adjust the second rate at which vehicle travel data is transmitted to the remote server. Regardless of such dynamic adjustments, of course the second rate is always higher than the first rate.

Where it is disclosed herein that a coupling is determined between an asset and a vehicle capable of transporting the asset, it will be understood that this coupling can be a physical coupling e.g. a trailer hitched to a truck, or a temporary association e.g. a piece of equipment being transported by or together with a vehicle in any suitable way. Most generally, a coupling means that the asset and vehicle are travelling together such that the asset follows the vehicle.

It is desirable to be able to track the travel paths of the asset and the vehicle in addition to determining a coupling state. If an asset has not yet been determined to be coupled to a vehicle, then the server can track its travel path based on the asset travel data transmitted at the first rate, but if this is a relatively low rate (for example, a travel data point only every 15 minutes) then the travel path may not be determined very accurately. However, once it has been determined that the asset is coupled to a vehicle, then the vehicle travel data which is being transmitted at the second rate (for example, every 10 seconds) can be exploited to refine the travel path for the asset. Thus in at least some embodiments of the present invention, after determining a coupling between the asset and the vehicle, the method further comprises: determining a travel parameter for the asset at a given point in time based on a corresponding travel parameter for the vehicle from a travel data point comprising a time stamp closest to the given point in time, so as to determine a travel path for the asset based on a travel path of the vehicle. In other words, the server is able to better track the asset by using the more frequent vehicle travel data to "fill the gaps" in the less frequent asset travel data.

In embodiments of the present invention the method determines a coupling between the asset and the vehicle even though the first rate does not match the second rate and hence the travel data points in the asset travel data will not align with the travel data points in the vehicle travel data. However, it has been recognised that the greater frequency of the vehicle travel data means that a next closest travel data point in the vehicle travel data can usually be found for a given time stamp of the asset travel data. In at least some embodiments, the method further comprises: comparing the one or more travel parameters at a given time stamp of the asset travel data by processing the vehicle travel data to determine (e.g. interpolate or estimate) the one or more (e.g. same) travel parameters of the vehicle travel data at a time (e.g. a point in time) matching the given time stamp of the asset travel data. The processing of the vehicle travel data can take many different forms. For example, the processing may involve up or down sampling of the vehicle travel data. For example, the processing may involve interpolating the vehicle travel data to determine travel parameters of the vehicle travel data at an interpolated time point matching the given time stamp of the asset travel data.

After processing the vehicle travel data in any suitable way, the method may optionally compare the one or more travel parameters at the given time stamp to determine a similarity score. Further optionally, the similarity score may be used when determining a coupling between the asset and the vehicle. For example, the similarity score may be compared to a predetermined threshold to determine a coupled or decoupled status. The similarity score may be based on any suitable assessment of the one or more travel parameters at the given time stamp. For example, the similarity score may be based on how many different travel parameters are found to be in common. Some travel parameters may be given a weighting over others. In some embodiments, the similarity score is based at least on a difference between the one or more travel parameters at the given time stamp. For example, a difference in the position (latitude and longitude) or a function thereof may be used as a simple way of determining a similarity score. Typically the similarity score is a dimensionless function.

Optionally the method may apply averaging techniques when determining the similarity score rather than using a comparison based on a single set of travel parameters at a given time stamp. This can make the similarity score more reliable, especially when there may be multiple assets and/or multiple vehicles travelling close to one another with very similar (if not identical) travel parameters at a given moment in time. Taking the example of a fleet of vehicles picking up assets and setting off from the same depot at the same time, some averaging over a time window helps to identify deviations between travel parameters that can be used to determine which asset is coupled to which vehicle.

In some examples, the method comprises: comparing the one or more travel parameters at the given time stamp $t_i$ to determine a difference between the one or more travel parameters at the given time stamp, and taking an average of the difference for a plurality of time stamps $t_{i\text{-}n}$ of the asset travel data, to determine a similarity score. In some examples, taking an average of the difference for a plurality of time stamps $t_{i\text{-}n}$ of the asset travel data uses a plurality of time stamps tin within a time window T. In some examples, the time window T has a fixed length, for example a fixed length of about 30 minutes, 40 minutes, 50 minutes, or one hour.

In some examples, taking an average of the difference for a plurality of time stamps $t_{i\text{-}n}$ of the asset travel data uses a weighted average of the difference for more recent time stamps $t_{i\text{-}n}$ within the time window T. In some examples, taking an average of the difference for a plurality of time stamps $t_{i\text{-}n}$ of the asset travel data uses an exponentially weighted average of the difference for more recent time stamps $t_{i\text{-}n}$ within the time window T. The more recent time stamps $t_{i\text{-}n}$ may be the last three, four or five time stamps, for instance.

Some further features of the method will now be described which apply irrespective of exactly how travel parameters of the asset travel data are compared to travel parameters of the vehicle travel data to determine a coupling between the asset and the vehicle.

In at least some embodiments, the server is arranged to store asset travel data and vehicle travel data as historical data, and the step of comparing the asset travel data to the vehicle travel data, at the remote server, includes comparing historical asset travel data to historical vehicle travel data. This can help to make the comparison more reliable, especially when the first telematics device of an asset has only just come online and it will take some time for the server to build up a picture of the asset travel data and its progression. For example, the historical travel data can be used to start the method in the server. At the moment the method is started, the server does not know the current coupling state of all vehicles and assets of a fleet. By employing the historical travel data, the method can determine a current coupling state and then update the coupling state based on real time travel data.

It is desirable for the method to be able to determine a coupling (or a decoupling) as rapidly as possible. If the remote server were to wait for the asset travel data to be updated before updating its coupling assessment then the method would be limited by the first rate being relatively low. Thus, in at least some embodiments, the step of comparing the asset travel data to the vehicle travel data, at the remote server, is triggered by the remote server receiving vehicle travel data from the second telematics device. This means that the comparison is repeated as frequently as the vehicle travel data is updated. However, it should be appreciated that the second telematics device may not separately transmit every instance of vehicle travel data; depending on its frequency this could cause transmission issues. In at least some embodiments, in addition or alternatively, the method comprises: configuring the second telematics device to store the vehicle travel data and to periodically transmit a message to the remote server comprising a plurality of travel data points for the vehicle. For example, if the vehicle travel data points are spaced by 10 seconds then a message may be periodically transmitted every minute, 90 seconds, or two minutes. The second telematics device may comprise a buffer to store the vehicle travel data. Optionally, firmware running in a processor of the second telematics device may be configured under instructions received from the remote server to periodically transmit messages at a given frequency.

Given that the second rate is typically an order of magnitude lower than the first rate, it is desirable for the first telematics device to transmit updates to the asset travel data as soon as they are available. Thus in at least some embodiments, in addition or alternatively, the method comprises: configuring the first telematics device to transmit to the remote server each travel data point for the asset contemporaneously with its time stamp. Of course, in reality the first telematics device may attempt to send the asset travel data as soon as the time stamp is applied, but there may be an inherent lag or external factors (such as interrupted mobile reception or Internet connection) causing a delay.

It will be appreciated that the methods described herein may be used to determine a coupling between multiple assets and a vehicle capable of transporting the assets, wherein each asset is carrying a first telematics device. For example, a vehicle such as a truck may be coupled with a first asset (e.g. trailer) and a second asset (e.g. construction site machinery being transported by the trailer). This can assist with fleet management and theft detection. Thus in at least some embodiments, in addition or alternatively, the method comprises: comparing one or more travel parameters of a first set of asset travel data to one or more travel parameters of the vehicle travel data, at the remote server, to determine a coupling between a first asset and the vehicle; and comparing one or more travel parameters of a second set of asset travel data to one or more travel parameters of the vehicle travel data, at the remote server, to determine a coupling between a second asset and the vehicle. The same step may be repeated for multiple assets as appropriate.

As mentioned above, it is a benefit of the present invention that the first rate is lower than the second rate so the first telematics device carried by the asset has a much lower power demand than the second telematics device carried by the vehicle. Furthermore, it has now been appreciated that the determined coupling state can be used to adjust the first rate and save even more power. In at least some embodiments, after determining a coupling between the asset and the vehicle, the method further comprises: configuring the first telematics device to reduce the first rate at which asset travel data is transmitted to the remote server. In other words, the first telematics device may be switched into a lower power (e.g. "idle") mode once coupling has been detected, at least until a decoupling is later detected. Alternatively, or in addition, the method may further comprise: configuring the first telematics device to reduce the first rate at which asset travel data is transmitted to the remote server depending on a power level of the battery. This may be used to preserve any remaining battery power (e.g. a "low power" mode).

This feature of varying the transmission rate for asset travel data is considered novel and inventive in its own right. Thus, according to a second aspect of the present invention, there is provided a telematics device associated with a moveable asset, the telematics device comprising: a battery as a power source; a transceiver arranged to send travel data for the moveable asset to a remote server at a variable transmission rate; and a processor configured to vary the transmission rate depending on at least one of: an instruction received from the remote server in response to a determination that the moveable asset is coupled with a vehicle; and/or a power level of the battery.

Preferably the processor is configured to reduce the transmission rate in one or both circumstances. As mentioned above, this might be in response to an instruction received from a remote server. By dynamically reducing the transmission rate to a lower value (e.g., only transmitting asset travel data every 30 minutes or once per hour), the telematics device in the asset can save battery power and thus increase the time until a recharge is necessary. This would reduce the amount of data sent to the remote server and hence reducing the transmission rate would reduce operational costs. To not harm the detection of a decoupling, the telematics device in the asset preferably only reduces the transmission rate until it detects a stop in its movement.

Some other features of such a telematics device are described further below in relation to an asset tracking system, it being understood that such features may be employed in embodiments of the second aspect of the invention without limitation. The ability of methods according to the present invention to determine a coupling between the asset and the vehicle may be particularly useful in the context of multiple vehicles (e.g. trucks) and/or multiple assets (e.g. trailers) departing from the same area.

In at least some embodiments, the method comprising: determining a coupling between an asset and a plurality of different vehicles, each capable of transporting the asset, by comparing the asset travel data to the vehicle travel data for each of the plurality of different vehicles. Following the discussion above, in at least some embodiments, comparing the asset travel data to the vehicle travel data for each of the plurality of different vehicles comprises: comparing the one or more travel parameters at a given time stamp to determine a similarity score for each of the plurality of different vehicles. For example, the method may comprise: determining a coupling between the asset and one of the plurality of different vehicles based on the lowest or best similarity score.

In at least some embodiments, in addition or alternatively, the step of determining a coupling between an asset and a plurality of different vehicles comprises: identifying a subset of candidate vehicles before comparing the asset travel data to the vehicle travel data for each of the subset of candidate vehicles. For example, identifying a subset of candidate vehicles may comprise identifying one or more vehicles within a predetermined physical range of the asset based on the asset travel data. In some examples the predetermined physical range is within 500 m, 1 km, 2 km, 3 km, 4 km, or up to 5 km. This step is optional but can decrease the computational effort in subsequent steps.

Once a coupling has been determined, the method may comprise one or more further steps to enable a fleet operator to benefit from this determination. In at least some embodiments, in addition or alternatively, the method further comprises: displaying a determined coupling between the asset and a vehicle, e.g. on a fleet manager display device. The determined coupling may be displayed in any suitable way, for example on a live map, so that a user sees the position of all vehicles and assets and it is visually indicated which vehicles are coupled to which asset. In addition, or alternatively, the method may further comprise generating a coupling and/or decoupling alert. In some examples the method may comprise sending a notification to a fleet manager when a new coupling or decoupling occurs. The automatic detection of vehicle and asset coupling enables a fleet manager to quickly detect wrongly chosen assets. The absence of coupling may be used to determine when assets are moving passively (i.e. without a truck coupled to the asset) and hence notification of an uncoupled status is a theft protection feature.

The method may further comprise one or more actions based on a determined coupling state. In at least some embodiments, the method further comprises: informing the second telematics device carried by the vehicle when a coupling with the asset is determined. For example, the second telematics device may use this determination to make crash detection more reliable.

In at least some embodiments, in addition or alternatively, after determining a coupling between the asset and the vehicle, the method further comprises: adjusting a route to be followed by the vehicle taking the asset into account. For example, when calculating a route a determined coupling may help to consider more accurate thresholds such as increased length, weight and width. This way the route calculation on the navigation device of a vehicle can be improved and helps to reduce situations in which (oversize) combinations of vehicle and asset get stuck on roads that are not suitable.

In at least some embodiments, in addition or alternatively, after determining a coupling between the asset and the vehicle, the method further comprises: updating one or more Key Performance Indicators for the vehicle by taking the asset into account. For example, a fleet manager may be given a KPI, such as fuel consumption, that distinguishes between a vehicle driving with or without an asset—as the additional load and weight will have a high influence on these values.

In at least some embodiments, in addition or alternatively, after determining a coupling between the asset and the vehicle, the method further comprises: checking the type of driving license held by the driver of the vehicle.

It will be appreciated that in methods according to embodiments of the present invention the first and second telematics devices are each configured to communicate independently with the remote server. In other words, the first and second telematics devices are not in communication with one another. This means that no hardware enabling a local (wired or wireless) connection is required. Furthermore, the first and second telematics devices can be installed completely independently of one another and no preliminary configuration is needed between them.

According to a further aspect of the present invention there is provided a non-transitory computer readable medium comprising computer readable instructions that, when executed on at least one processor, cause the at least one processor to perform a method according to any of the embodiments described herein.

The methods described herein are computer-implemented methods. The means for carrying out any of the steps of the computer-implemented methods may comprise a set of one or more processors configured, e.g. programmed, to do so. A given step may be carried out using the same or a different set of processors to another step. Any given step may be carried out using a combination of sets of processors.

The present invention extends to a central controller or server configured to implement any of the methods described herein. Thus, according to a further aspect of the present invention there is provided a server for determining a coupling between an asset and a vehicle capable of transporting the asset, wherein the asset is carrying a first telematics device configured to transmit asset travel data to the server at a first rate and the vehicle is carrying a second telematics device configured to transmit vehicle travel data to the server at a second rate, the second rate being higher than the first rate, the server comprising:

a communications device arranged to communicate with the asset and one or more vehicles capable of transporting the asset, the communications device receiving the asset travel data from the first telematics device at the first rate and receiving the vehicle travel data from the second telematics device at the second rate;

the asset travel data and vehicle travel data comprising a plurality of travel data points, each travel data point comprising at least a time stamp and one or more travel parameters; and at least one processor arranged to compare one or more travel parameters of the asset travel data to one or more travel parameters of the vehicle travel data to determine a coupling between the asset and the vehicle.

In at least some embodiments, the communications device is arranged to provide a determined coupling between the asset and a vehicle to a remote display terminal. The determined coupling may be used to adapt or initiate one or more actions as already described above.

In at least some embodiments, the server further comprises a memory arranged to store the asset travel data and vehicle travel data. The memory may therefore provide historical travel data for use as already described above.

It has already been described above how an asset can be tracked and its coupling status determined according to various embodiments. A server-based system may be implemented to carry out any of the methods described herein.

According to a further aspect of the present invention there is provided an asset tracking system comprising a server, one or more first telematics devices each carried by an asset, and one or more second telematics devices each carried by a vehicle capable of transporting an asset;

the server comprising a communications device arranged to communicate with the one or more first telematics devices and with the one or more second telematics devices;

wherein each first telematics device is configured to transmit asset travel data to the server at a first rate, and each second telematics device is configured to transmit vehicle travel data to the server at a second rate, the second rate being higher than the first rate;

wherein the one or more first and second telematics devices are each configured to communicate independently with the communications device.

As mentioned above, it is an important feature that the first and second telematics devices communicate independently, i.e. they are not in communication with one another. This means that no hardware enabling a local (wired or wireless) connection is required. Furthermore, the first and second telematics devices can be installed in the system completely independently of one another and no preliminary configuration is needed between them.

The different transmission rates for vehicle and asset travel data enable the first and second telematics devices to be better adapted to their respective environments. In at least some embodiments, each first telematics device comprises a battery as a power source and/or each second telematics device comprises an input for connection to a vehicle power source. For example, each second telematics device may be permanently associated with a vehicle, whether as an integrated device or a mobile device plugged into an On-Board Diagnostics (OBD) port.

The second telematics devices each carried by a vehicle may be more sophisticated than the first telematics devices. While the second telematics devices may sample vehicle travel data at a high rate (e.g. once every few seconds), it can be convenient to limit the transmission rate to the server. In at least some embodiments, each second telematics device comprises a buffer arranged to store the vehicle travel data and each second telematics device is configured to periodically transmit a message to the remote server comprising a plurality of travel data points from the stored vehicle travel data. As is mentioned above, the server may send a command to each second telematics device to trigger such a message.

In such systems, the server may be arranged to carry out any steps of the methods described herein. In at least some embodiments, the communications device is arranged to receive the asset travel data and the vehicle travel data, the asset travel data and the vehicle travel data comprising a plurality of travel data points, each travel data point comprising at least a time stamp and one or more travel parameters; the server further comprises at least one processor arranged to compare one or more travel parameters of the asset travel data to one or more travel parameters of the vehicle travel data to determine a coupling between the asset and the vehicle; wherein, after determining a coupling between the asset and the vehicle, the at least one processor is arranged to determine a travel parameter for the asset at a given point in time based on a corresponding travel parameter for the vehicle from a travel data point comprising a time stamp closest to the given point in time, so as to determine a travel path for the asset based on a travel path of the vehicle; and optionally the system further comprises an output terminal arranged to communicate with the server and display the determined travel path for the asset and the travel path of the vehicle. The output terminal is preferably remote from the server, for example a fleet manager terminal.

In embodiments of the present invention, the one or more travel parameters comprises one or more of: position, latitude, longitude, direction, speed, acceleration, driving events, and engine data (e.g. fuel usage, RPM, etc.).

In some examples, the method further comprises: obtaining a travel parameter relating to a driving event of the asset and obtaining the same travel parameter relating to a driving event of the vehicle, each travel data point further comprising the driving event as a travel parameter associated with the time stamp. The driving event may, for example, be braking, cornering, speeding up, turning, swerving, a tyre puncture event, or an engine failure event. The travel parameter relating to the driving event may, for example, be one or more of acceleration, deceleration, pitch, yaw, or roll. The step of comparing the travel parameters to determine a coupling may optionally look for matching driving events in the asset travel data and the vehicle travel data, e.g. as an indication that the vehicle and the asset are truly coupled together.

The Applicant has recognised that multiple travel parameters may be included in the asset and vehicle travel data to assist with an accurate coupling determination. These travel parameters may include one or more motion-related travel parameters such as position, speed, acceleration, driving events, etc. as mentioned above and optionally also one or more other environment-related travel parameters as will be described further below. If the one or more travel parameters merely comprise the position of the asset and vehicle and, for example, the vehicle location data is transmitted every 10 seconds, and the asset location data is transmitted every 5 minutes, and the distance between the last-known asset position and last-known vehicle position are used to calculate the distance between the vehicle and asset, these positions may be up to 4 minutes 50 seconds apart in time. This time difference may lead to inaccuracies in the calculation of the distance, in particular as the calculated distance used in the comparison (e.g. to determine the similarity score) is always larger than the real distance between the asset and vehicle. An increase in the calculated distance may cause the predetermined threshold used to determine a coupled or decoupled status to be increased, thus increasing the chance of an error when determining a coupled or decoupled status. Further to this, more travel data points may be required to accurately detect a coupling, thus increasing the time between the start of the trip and the detection of a coupling between a vehicle and asset.

As the asset travel data transmission rate is decreased, this inaccuracy may be further increased, such that if position data from the asset is transmitted on the order of minutes, it is unlikely that asset and vehicle couplings could be detected with an acceptable error rate. Errors may occur if an asset is coupled to another vehicle from the same customer which is in the same car park at the same time, which may be common for customers with multiple vehicles and assets.

The Applicant has appreciated that alongside interpolating the position of the vehicle at a time matching the given time stamp of the asset position, using multiple travel parameters of the asset and vehicle travel data to determine a coupling between the asset and the vehicle may improve the accuracy of the coupling determination. For example, the similarity score may be calculated using some or all of the available motion-related travel parameters transmitted from both first and second telematics devices, such as position, speed, acceleration, driving events (e.g. harsh braking), and engine data as mentioned above, but also other environment-related travel parameters such as road inclination, ambient temperature and ambient light levels which can be compared between the asset and the vehicle. Using additional travel parameters aside from position enables couplings to be detected faster and with a higher accuracy.

As such, according to a further aspect of the present invention, there is provided a method of determining a coupling between an asset and a vehicle capable of transporting the asset, wherein the asset is carrying a first telematics device and the vehicle is carrying a second telematics device, the method comprising:

configuring the first telematics device to transmit asset travel data to a remote server;

configuring the second telematics device to transmit vehicle travel data to the remote server;

each of the asset travel data and vehicle travel data comprising a plurality of travel data points, each travel data point comprising a time stamp and multiple travel parameters associated with the time stamp, wherein the multiple travel parameters comprise at least position and a further motion-related travel parameter; and comparing the multiple travel parameters of the asset travel data to the multiple travel parameters of the vehicle travel data, at the remote server, to determine a coupling between the asset and the vehicle.

It will be appreciated that in this method the multiple travel parameters, in particular position and the further motion-related travel parameter, from both the asset and the vehicle are used in order to determine a coupling between the asset and the vehicle. For example, the coupling determination may be based on the similarity of the multiple travel parameters in the asset travel data and vehicle travel data. By increasing the number of different travel parameters associated with the time stamp, the comparison can more quickly and accurately determine a coupling. In addition to position, the multiple travel parameters comprise a further motion-related travel parameter, such as one or more of: speed, acceleration, driving events (e.g. harsh braking), vehicle/asset orientation, and engine data. A motion-related travel parameter will be understood as a parameter dependent on the driving action of the vehicle (and hence also affecting the asset transported by the vehicle).

In some examples, the further motion-related travel parameter is asset/vehicle orientation. Orientational data may be obtained from an inertial sensor, for example an inertial measurement unit (IMU). Such a unit may be installed in the first and/or second telematics devices, or it may be external to the telematics devices and provide such orientation data to the telematics devices. The IMU may be used to provide orientation data for the asset/vehicle relating to its "real world" orientation, for example the heading. In at least some examples, the orientation is an instantaneous travel parameter. The orientation may change rapidly in time, depending on the driving action of the vehicle, and hence works well to help determine coupling.

In some examples, in addition or alternatively, the further motion-related travel parameter which may be used in addition to position is speed and/or acceleration. The Applicant has realised that, aside from position, including a further motion-related travel parameter of an asset and a vehicle provides an accurate way to determine a coupling between the vehicle and asset. The further motion-related travel parameter (such as speed and/or acceleration) may be obtained from different sources such as a GPS sensor (e.g. located in the first/second telematics device which is installed in the asset/vehicle), a CAN bus (e.g. connected to the first/second telematics device, whether permanently or via an OBD port) or Fleet Management Systems Interface (FMS) in the asset/vehicle (e.g. connected to the first/second telematics device), or a sensor mounted to the asset/vehicle external to the first/second telematics device (such as a wheel speed sensor or accelerometer). Importantly, the Applicant has appreciated that the further motion-related travel parameter used in the comparison (e.g. to determine the similarity score) is preferably not an average value which may be derived indirectly based on position measurements, e.g. the average speed or acceleration derived from position measurements using a GPS receiver (or any other global navigation satellite system (GNSS) receiver, or equivalent location determining device), as particularly in the case of low frequency data transmissions (e.g. every 5 minutes), the further motion-related travel parameter will have been averaged over a long time and will not be accurate for determining a coupling. As such, in at least some embodiments the further motion-related parameter comprises an instantaneous sensor reading. The sensor reading being instantaneous means a sensor reading associated with a single time stamp, in contrast with a motion-related parameter derived from position (or another travel parameter) at multiple time stamps and therefore averaged rather than instantaneous.

In at least some embodiments the further motion-related parameter comprises an instantaneous speed of the vehicle or asset obtained at the time stamp. In such examples, the asset travel data comprises a plurality of asset travel data points, each asset travel data point comprising a time stamp and measurements of both position and instantaneous speed obtained for the asset at the time stamp, and the vehicle travel data comprises a plurality of vehicle travel data points, each vehicle travel data point comprising a time stamp and measurements of both position and instantaneous speed obtained for the vehicle at the time stamp.

The instantaneous speed being obtained at the time stamp means that the instantaneous speed may, in some examples, be measured at the time stamp using a sensor in the first/second telematics device, for example the first/second telematics device may include a GPS sensor (or any other global navigation satellite system (GNSS) receiver) to measure the instantaneous speed. The instantaneous speed being obtained at the time stamp also means that the instantaneous speed may, in some examples, be obtained at the time stamp from a speed sensor external to the first/second telematics device. For example, the first/second telematics device may be configured to receive instantaneous asset/vehicle speed data from a dedicated external speed sensor mounted on the asset/vehicle body. The instantaneous speed being obtained at the time stamp also means that the instantaneous speed may, in some examples, be obtained at the time stamp from an internal communications network (such as a CAN bus) of the asset or vehicle. For example, the second telematics device may be configured to receive instantaneous vehicle speed data from a vehicle CAN bus.

In many situations where coupling is being determined for multiple assets and vehicles at the same position (e.g. leaving a freight park together), the small differences in instantaneous speed can be enough to allow an accurate coupling determination to be made. However, the Applicant has appreciated that a further motion-related parameters such as instantaneous acceleration (which may be obtained from an accelerometer) may be taken into account as well, or even instead of instantaneous speed. Instantaneous acceleration obtained from an accelerometer may comprise a three-dimensional acceleration measurement, as opposed to the one-dimensional speed measurement which may be obtained from a GPS sensor or speed sensor. In addition, one or more further travel parameters may be taken into account as well.

In at least some embodiments, the method further comprises: obtaining an environment-related travel parameter for the asset and obtaining the same environment-related travel parameter for the vehicle, each travel data point further comprising the environment-related travel parameter as one of the multiple travel parameters associated with the time stamp. In at least some embodiments, the method further comprises: obtaining an instantaneous travel parameter relating to the travel environment of the asset and obtaining the same instantaneous travel parameter relating to the travel environment of the vehicle, each travel data point further comprising the instantaneous travel parameter as one of the multiple travel parameters associated with the time stamp. An environment-related travel parameter, i.e. relating to the travel environment, will be understood as a parameter that is independent of the driving action of the vehicle and instead dependent on the external environment around the vehicle/asset. In particular, the environment-related travel parameter may be dependent on the local environment, e.g. within one or two metres of the vehicle/asset. For example, the instantaneous travel parameter is selected from one or more of: road inclination, ambient temperature, ambient light level, magnetic field strength or direction. In the same way as instantaneous speed data, the step of obtaining an environment-related instantaneous travel parameter may mean measuring the instantaneous travel parameter using a sensor in the first/second telematics device, or obtaining the instantaneous travel parameter from a sensor external to the first/second telematics device, for example attached to the body of the vehicle or asset. The external sensor may be connected directly to the first/second telematics device or the external sensor may be connected to an internal communications network (such as a CAN bus) of the asset or vehicle. For example, the second telematics device may be configured to receive instantaneous readings for road inclination, ambient temperature, vehicle orientation, magnetic field strength and/or direction, and/or ambient light level from a vehicle CAN bus.

In at least some embodiments, the first telematics device comprises a first sensor arranged to measure the instantaneous travel parameter relating to the travel environment of the asset and/or the second telematics device comprises a second sensor arranged to measure the instantaneous travel parameter relating to the travel environment of the vehicle. By including dedicated sensors in the first and second telematics device to instantaneously measure an environment-related travel parameter, it is ensured that the server has this information available in both the asset and vehicle travel data to use in determining a coupling.

In some examples, the instantaneous travel parameter relating to the travel environment of the asset/vehicle is a magnetic field reading, e.g. magnetic field strength and/or direction. A magnetometer, either as part of an IMU as mentioned above, or as a separate sensor, may provide magnetic field data unique to the position of the asset/vehicle. This can also be well-suited for helping to determine coupling.

In some examples, in addition or alternatively, the instantaneous travel parameter relating to the travel environment of the asset/vehicle is road inclination. An IMU as mentioned above, or else a separate accelerometer in combination with a gyroscope, may provide road inclination readings for the asset/vehicle. As inclination is a fast-changing parameter related to the travel environment, it may provide a better coupling indication than other environment-related travel parameters (such as ambient temperature, for example) which is much less varied over a small area and, as such, provides a less accurate comparison for coupling determination.

In various examples, the first telematics device may not have any data connection to the vehicle. Preferably the first telematics device is arranged to measure an instantaneous travel parameter relating to the travel environment of the asset independently of the second telematics device and the vehicle. In at least some embodiments, the first telematics device comprises a sensor arranged to measure one or more travel parameters, e.g. including an instantaneous travel parameter relating to the travel environment of the asset. For example, the sensor may be one or more of: an accelerometer, gyroscope, temperature sensor, ambient light sensor, inertial measurement unit (IMU), or magnetometer.

The second telematics device may conveniently obtain road inclination data from the vehicle, for example because the vehicle already has its own onboard IMU. Using road inclination as one of the multiple travel parameters to determine a coupling between the asset and vehicle may require the first telematics device to include its own means for measuring road inclination. In at least some embodiments, the first telematics device comprises an IMU, and the method further comprises determining the instantaneous inclination of the road on which the asset is travelling. It may also be beneficial for the second telematics device to include its own dedicated IMU for measuring road inclination, so that this travel parameter is available without relying on a connection to vehicle data.

In at least some embodiments, the first and second telematics devices each comprise an inertial measurement unit, and the method further comprises using the inertial measurement unit to measure a first instantaneous inclination of the road on which the asset is travelling and a second instantaneous inclination of the road on which the vehicle is travelling, each travel data point further comprising the first or second instantaneous inclination as one of the multiple travel parameters associated with the time stamp. These first and second instantaneous inclination measurements may be used to determine and compare the current inclination experienced by the vehicle and asset, and thus any difference in inclination may therefore be used (e.g. in the similarity score calculation described above) in order to further improve the accuracy of the coupling determination.

In at least some embodiments, the first telematics device is configured to transmit asset travel data to the server at a first rate; and the second telematics device is configured to transmit vehicle travel data to the remote server at a second rate, the second rate being higher than the first rate. This may provide a way for the server to distinguish between asset travel data and vehicle travel data, and possibly verify the source of incoming travel data, although usually the asset travel data is transmitted with an asset ID and the vehicle travel data is transmitted with a vehicle ID. A benefit of the first telematics device transmitting asset travel data to the server at a lower rate is that this device can be powered by a battery that will not need recharging during a typical journey, rather than relying on an external power supply (which may not even be available, depending on the type of asset e.g. a trailer or equipment transported by a trailer). The second telematics device may be installed on a vehicle with a connection to consume power from the onboard powertrain, and hence better able to support a higher rate of transmission for the vehicle travel data. The embodiments disclosed herein can assist the server with comparing one or more travel parameters between the asset travel data and the vehicle travel data, to determine a coupling between the asset and the vehicle, despite the first and second rates being different.

In some embodiments the first rate may correspond to asset travel data being transmitted approximately once every 1 minute, 2 minutes, 3 minutes, 4 minutes, 5 minutes, 6 minutes, 7 minutes, 8 minutes, 9 minutes, or 10 minutes. In some embodiments the first rate may correspond to asset travel data being transmitted approximately once every 10 minutes, 15 minutes, 20 minutes, or more. In some embodiments the first rate may correspond to asset travel data being transmitted only once every hour on average. In some embodiments the second rate may correspond to vehicle travel data being transmitted approximately once every 1 s, 2 s, 3 s, 4 s, 5 s, 6 s, 7 s, 8 s, 9 s, or 10 s at least. In some embodiments the second rate may correspond to vehicle travel data being transmitted approximately once every 10 s, 20 s, 30 s, 40 s, 50 s, or 60 s at least. In some embodiments the second rate may correspond to asset travel data being transmitted no more frequently than once every 1 s.

In at least some embodiments, the second telematics device is configured to transmit vehicle travel data to the remote server at a variable second rate. In some embodiments, the second rate is dynamically varied, for example in response to a driving event or driving environment. For instance, the second telematics device may be configured to transmit vehicle travel data to the remote server at a higher second rate when the vehicle travels round a bend as compared to the vehicle travelling in a straight line. In at least some embodiments, the method further comprises: configuring the second telematics device to dynamically adjust the second rate at which vehicle travel data is transmitted to the remote server.

As previous explained, it is desirable to be able to track the travel paths of the asset and the vehicle in addition to determining a coupling state, however low data transmission rates can result in the determined travel path not being very accurate. However, once it has been determined that the asset is coupled to a vehicle, then the vehicle travel data which may be transmitted at the second rate can be exploited to refine the travel path for the asset. Thus, in at least some embodiments, after determining a coupling between the asset and the vehicle, the method further comprises: determining the multiple travel parameters for the asset at a given point in time based on corresponding multiple travel parameters for the vehicle from a travel data point comprising a time stamp closest to the given point in time, so as to determine a travel path for the asset based on a travel path of the vehicle. The server may therefore better track the asset if there is more frequent vehicle travel data to "fill the gaps" in the less frequent asset travel data.

In at least some embodiments of the method determines a coupling between an asset and a vehicle even if the first rate does not match the second rate and hence the travel data points in the asset travel data will often not align with the travel data points in the vehicle travel data. However, it has been recognised that a greater frequency of the vehicle travel data means that a next closest travel data point in the vehicle travel data can usually be found for a given time stamp of the asset travel data. In at least some embodiments, the method further comprises: comparing the multiple travel parameters of the asset at a given time stamp of the asset travel data by processing the vehicle travel data to interpolate or estimate the same multiple travel parameters of the vehicle at a point in time matching the given time stamp of the asset travel data.

After processing the travel data in any suitable way, the method may optionally compare the multiple travel parameters at a given time stamp to determine a similarity score. Further optionally, the similarity score may be used when determining a coupling between the asset and the vehicle. For example, the similarity score may be compared to a predetermined threshold to determine a coupled or decoupled status. In some embodiments, the similarity score is based at least on a difference between the multiple travel parameters at the given time stamp. Some travel parameters may be given a weighting over others. Typically the similarity score is a dimensionless function.

In order to determine a similarity score using the positon and a further motion-related parameter, using instantaneous speed as an example, the interpolated instantaneous speed of the vehicle $v\_v$ may be compared to the instantaneous speed of the asset $v\_a$ at the given time stamp. The difference between these speed values may therefore be calculated as $dv=v\_v-v\_a$. This speed difference may then be integrated to determine a dimensionless 'distance' between the travel parameters of the vehicle and asset. As will be appreciated, the smaller the 'distance' between the travel parameters of the vehicle and asset, the more similar their instantaneous position and speed and thus the higher likelihood that they are coupled to one another. This 'distance' may be then be further used to determine a similarity score S, which may then be compared to a predetermined threshold to determine a coupled or decoupled status of the asset and vehicle.

An example calculation to determine the similarity score using geographic position p, speed v and additional travel parameters x is:

$$S=wp*d\_p+wv*d\_v+wx*d\_x,$$

Where: $d\_p$ is a dimensionless difference in the positions of the asset and vehicle from the asset travel data at a given time stamp, and the interpolated vehicle travel data at the given time stamp; $d\_v$ is a dimensionless difference in the instantaneous speeds of the asset and vehicle from the asset travel data at a given time stamp, and the interpolated vehicle travel data at the given time stamp; $d\_x$ is a dimensionless difference between all other potential travel parameters of the asset and vehicle, such as acceleration, driving events, road inclination, ambient temperature, ambient light levels, etc. Each of these differences is multiplied by a weighting factor: wp for position, wv for speed, and wx for all other travel parameters. The weighting factors may be predetermined to optimise the error rate of detected couplings. Such weighting factors may be predetermined through minimising the error rate on test data which has been obtained. The weighting factors may be further optimised through the acquisition of travel data from the vehicles and assets to further minimise the error rate of coupling detection.

Optionally the method may apply averaging techniques when determining the similarity score rather than using a comparison based on a single set of travel parameters at a given time stamp. This can make the similarity score more reliable, especially when there may be multiple assets and/or multiple vehicles travelling close to one another with very similar (if not identical) travel parameters at a given moment in time. Taking the example of a fleet of vehicles picking up assets and setting off from the same depot at the same time, some averaging over a time window helps to identify deviations between travel parameters that can be used to determine which asset is coupled to which vehicle.

In some examples, the method comprises: comparing the multiple travel parameters at the given time stamp $t_i$ to determine a difference between the multiple travel parameters at the given time stamp, and taking an average of the difference for a plurality of time stamps $t_{i-n}$ of the asset travel data, to determine a similarity score. In some examples, taking an average of the difference for a plurality of time stamps $t_{i-n}$ of the asset travel data uses a plurality of time stamps $t_{i-n}$ within a time window T. In some examples, the time window T has a fixed length, for example a fixed length of about 30 minutes, 40 minutes, 50 minutes, or one hour.

In some examples, taking an average of the difference for a plurality of time stamps $t_{i-n}$ of the asset travel data uses a weighted average of the difference for more recent time stamps $t_{i-n}$ within the time window T. In some examples, taking an average of the difference for a plurality of time stamps $t_{i-n}$ of the asset travel data uses an exponentially weighted average of the difference for more recent time stamps $t_{i-n}$ within the time window T. The more recent time stamps $t_{i-n}$ may be the last three, four or five time stamps, for instance.

Some further features of the methods described above will now be described which apply irrespective of exactly how travel parameters of the asset travel data are compared to travel parameters of the vehicle travel data to determine a coupling between an asset and a vehicle.

It is desirable for the method to be able to determine a coupling (or a decoupling) as rapidly as possible. Although using both position and a further motion-related parameter as travel parameters increases the speed of coupling (or decoupling) detection, this may still be limited by the rate at which the asset travel data is updated. If the remote server were to wait for the asset travel data to be updated before updating its coupling assessment then the method would be limited by the first rate being relatively low. Thus, in at least some embodiments, the step of comparing the asset travel data to the vehicle travel data, at the remote server, is triggered by the remote server receiving vehicle travel data from the second telematics device. This means that the comparison is repeated as frequently as the vehicle travel data is updated. However, it should be appreciated that the second telematics device may not separately transmit every instance of vehicle travel data; depending on its frequency this could cause transmission issues.

In at least some embodiments, in addition or alternatively, the method comprises: configuring the second telematics device to store the vehicle travel data and to periodically transmit a message to the remote server comprising a plurality of travel data points for the vehicle. For example, if the vehicle travel data points are spaced by 10 seconds then a message may be periodically transmitted every minute, 90 seconds, or two minutes. The second telematics device may comprise a buffer to store the vehicle travel data. Optionally, firmware running in a processor of the second telematics device may be configured under instructions received from the remote server to periodically transmit messages at a given frequency.

Given that the second rate may be an order of magnitude lower than the first rate, it may be desirable for the first telematics device to transmit updates to the asset travel data as soon as they are available. Thus in at least some embodiments, in addition or alternatively, the method comprises: configuring the first telematics device to transmit to the remote server each travel data point for the asset contemporaneously with its time stamp. Of course, in reality the first telematics device may attempt to send the asset travel data as soon as the time stamp is applied, but there may be an inherent lag or external factors (such as interrupted mobile reception or Internet connection) causing a delay.

It will be appreciated that the methods described herein may be used to determine a coupling between multiple assets and a vehicle capable of transporting the assets, wherein each asset is carrying a first telematics device. For example, a vehicle such as a truck may be coupled with a first asset (e.g. trailer) and a second asset (e.g. construction site machinery being transported by the trailer). This can assist with fleet management and theft detection. Thus in at least some embodiments, in addition or alternatively, the method comprises: comparing one or more travel parameters of a first set of asset travel data to one or more travel parameters of the vehicle travel data, at the remote server, to determine a coupling between a first asset and the vehicle; and comparing one or more travel parameters of a second set of asset travel data to one or more travel parameters of the vehicle travel data, at the remote server, to determine a coupling between a second asset and the vehicle. The same step may be repeated for multiple assets as appropriate.

The ability of the methods described herein to determine a coupling between the asset and the vehicle may be particularly useful in the context of multiple vehicles (e.g. trucks) and/or multiple assets (e.g. trailers) departing from the same area, especially in high density traffic area such as large cities where many assets and vehicles are operated and monitored by the server. Even though the asset travel data may be transmitted with an asset ID and the vehicle travel data may be transmitted with a vehicle ID, these IDs only identify the source of the travel data and a separate assessment is required to independently determine which asset is coupled with which vehicle.

In at least some embodiments, the method further comprises: determining a coupling between an asset and a plurality of different vehicles, each capable of transporting the asset, by comparing the asset travel data to the vehicle travel data for each of the plurality of different vehicles and comparing the multiple travel parameters at a given time stamp to determine a similarity score for each of the plurality of different vehicles. For example, the method may comprise: determining a coupling between the asset and one of the plurality of different vehicles based on the lowest or best similarity score.

In at least some embodiments, in addition or alternatively, the step of determining a coupling between an asset and a plurality of different vehicles comprises: identifying a subset of candidate vehicles before comparing the asset travel data to the vehicle travel data for each of the subset of candidate vehicles. For example, identifying a subset of candidate vehicles may comprise identifying one or more vehicles within a predetermined physical range of the asset based on the asset travel data. In some examples the predetermined physical range is within 500 m, 1 km, 2 km, 3 km, 4 km, or up to 5 km. Alternatively, determining the subset may comprise identifying one or more vehicles within a predetermined instantaneous speed range from the asset based on the asset travel data. In some examples, the predetermined instantaneous speed range is 1 km/h, 2, km/h, 3 km/h, 4 km/h, or up to 5 km/h. This step is optional but can decrease the computational effort in subsequent steps.

Once a coupling has been determined, the method may comprise one or more further steps to enable a fleet operator to benefit from this determination. In at least some embodiments, in addition or alternatively, the method further comprises: displaying a determined coupling between the asset and a vehicle, e.g. on a fleet manager display device. The determined coupling may be displayed in any suitable way, for example on a live map, so that a user sees the position of all vehicles and assets and it is visually indicated which vehicles are coupled to which asset. In addition, or alternatively, the method may further comprise generating a coupling and/or decoupling alert. In some examples the method may comprise sending a notification to a fleet manager when a new coupling or decoupling occurs. The automatic detection of vehicle and asset coupling enables a fleet manager to quickly detect wrongly chosen assets. The absence of coupling may be used to determine when assets are moving passively (i.e. without a truck coupled to the asset) and hence notification of an uncoupled status is a theft protection feature. Such notification is generated by the server for communication to a device capable of informing a fleet operator.

The method may further comprise one or more actions based on a determined coupling state. In at least some embodiments, the method further comprises: informing the second telematics device carried by the vehicle when a coupling with the asset is determined. For example, the second telematics device may use this determination to make crash detection more reliable.

In at least some embodiments, in addition or alternatively, after determining a coupling between the asset and the vehicle, the method further comprises: adjusting a route to be followed by the vehicle taking the asset into account. For example, when calculating a route a determined coupling may help to consider more accurate thresholds such as increased length, weight and width. This way the route calculation on the navigation device of a vehicle can be improved and helps to reduce situations in which (oversize) combinations of vehicle and asset get stuck on roads that are not suitable.

In at least some embodiments, in addition or alternatively, after determining a coupling between the asset and the vehicle, the method further comprises: updating one or more Key Performance Indicators for the vehicle by taking the asset into account. For example, a fleet manager may be given a KPI, such as fuel consumption, that distinguishes between a vehicle driving with or without an asset—as the additional load and weight will have a high influence on these values.

In at least some embodiments, in addition or alternatively, after determining a coupling between the asset and the vehicle, the method further comprises: checking the type of driving license held by the driver of the vehicle.

It will be appreciated that in methods according to embodiments of the present invention the first and second telematics devices are each configured to communicate independently with the remote server. In other words, the first and second telematics devices are not in communication with one another. This means that no hardware enabling a local (wired or wireless) connection is required. Furthermore, the first and second telematics devices can be installed completely independently of one another and no preliminary configuration is needed between them.

According to a further aspect of the present invention there is provided a non-transitory computer readable medium comprising computer readable instructions that, when executed on at least one processor, cause the at least one processor to perform a method according to any of the embodiments described herein.

The methods described herein are computer-implemented methods. The means for carrying out any of the steps of the computer-implemented methods may comprise a set of one or more processors configured, e.g. programmed, to do so. A given step may be carried out using the same or a different set of processors to another step. Any given step may be carried out using a combination of sets of processors.

The present invention extends to a central controller or server configured to implement any of the methods described herein. Thus, according to a further aspect of the present invention there is provided a server for determining a coupling between an asset and a vehicle capable of transporting the asset, wherein the asset is carrying a first telematics device and the vehicle is carrying a second telematics device configured to transmit vehicle travel data to the server, the server comprising:

a communications device arranged to communicate with the asset and one or more vehicles capable of transporting the asset, the communications device receiving the asset travel data from the first telematics device and receiving the vehicle travel data from the second telematics device;

each of the asset travel data and vehicle travel data comprising a plurality of travel data points, each travel data point comprising a time stamp and multiple travel parameters associated with the time stamp, wherein the multiple travel parameters comprise at least position and a further motion-related parameter; and at least one processor arranged to compare the multiple travel parameters of the asset travel data to the multiple travel parameters of the vehicle travel data to determine a coupling between the asset and the vehicle.

In at least some embodiments, the communications device is arranged to provide a determined coupling between the asset and a vehicle to a remote display terminal. The determined coupling may be used to adapt or initiate one or more actions as already described above.

In at least some embodiments, the server further comprises a memory arranged to store the asset travel data and vehicle travel data. The memory may therefore provide historical travel data for use as already described above.

It has already been described above how an asset can be tracked and its coupling status determined according to various embodiments. A server-based system may be implemented to carry out any of the methods described herein.

According to a further aspect of the present invention there is provided an asset tracking system comprising a server, one or more first telematics devices each carried by an asset, and one or more second telematics devices each carried by a vehicle capable of transporting an asset;

the server comprising a communications device arranged to communicate with the one or more first telematics devices and with the one or more second telematics devices;

wherein each first telematics device is configured to transmit asset travel data to the server, and each second telematics device is configured to transmit vehicle travel data to the server;

wherein each of the asset travel data and vehicle travel data comprise a plurality of travel data points, each travel data point comprising a time stamp and multiple travel parameters associated with the time stamp, wherein the multiple travel parameters comprise at least position and a further motion-related parameter;

wherein the one or more first and second telematics devices are each configured to communicate independently with the communications device.

As mentioned above, it is an important feature that the first and second telematics devices communicate independently, i.e. they are not in communication with one another. This means that no hardware enabling a local (wired or wireless) connection is required. Furthermore, the first and second telematics devices can be installed in the system completely independently of one another and no preliminary configuration is needed between them.

In at least some embodiments, each first telematics device comprises a battery as a power source and/or each second telematics device comprises an input for connection to a vehicle power source. For example, each second telematics device may be permanently associated with a vehicle, whether as an integrated device or a mobile device plugged into an On-Board Diagnostics (OBD) port. Different transmission rates for vehicle and asset travel data are beneficial if the first and second telematics devices have different power sources and enable the first and second telematics devices to be better adapted to their respective environments.

In at least some embodiments, each second telematics device comprises an input for connection to a vehicle data source, such as a vehicle CAN bus. As described above, this may allow the second telematics device to obtain one or more instantaneous travel parameters such as speed, acceleration, road inclination, temperature, etc. which are already measured by the vehicle engine control unit (ECU).

The second telematics devices each carried by a vehicle may be more sophisticated than the first telematics devices. The second telematics devices may sample vehicle travel data at a high rate (e.g. once every few seconds) however it can be convenient to limit the transmission rate to the server. In at least some embodiments, each second telematics device comprises a buffer arranged to store the vehicle travel data and each second telematics device is configured to periodically transmit a message to the remote server comprising a plurality of travel data points from the stored vehicle travel data. As is mentioned above, the server may send a command to each second telematics device to trigger such a message.

In such systems, the server may be arranged to carry out any steps of the methods described herein. In at least some embodiments, the communications device is arranged to receive the asset travel data and the vehicle travel data, the asset travel data and the vehicle travel data comprising a plurality of travel data points, each travel data point comprising a time stamp and multiple travel parameters associated with the time stamp; the server further comprising at least one processor arranged to compare the multiple travel parameters of the asset travel data to the multiple travel parameters of the vehicle travel data to determine a coupling between the asset and the vehicle, wherein the multiple travel parameters comprise at least position and a further motion-related parameter; wherein, after determining a coupling between the asset and the vehicle, the at least one processor is arranged to determine one of the multiple travel parameters for the asset at a given point in time based on a corresponding one of the multiple travel parameters for the vehicle from a travel data point comprising a time stamp closest to the given point in time, so as to determine a travel path for the asset based on a travel path of the vehicle; and optionally the system further comprises an output terminal arranged to communicate with the server and display the determined travel path for the asset and the travel path of the vehicle. The output terminal is preferably remote from the server, for example a fleet manager terminal.

As mentioned above, if the first rate is lower than the second rate, the first telematics device carried by the asset has a much lower power demand than the second telematics device carried by the vehicle. Furthermore, it has now been appreciated that the determined coupling state can be used to adjust the first rate and save even more power. In at least some embodiments, after determining a coupling between the asset and the vehicle, the method further comprises: configuring the first telematics device to reduce the first rate at which asset travel data is transmitted to the remote server. In other words, the first telematics device may be switched into a lower power (e.g. "idle") mode once coupling has been detected, at least until a decoupling is later detected. Alternatively, or in addition, the method may further comprise: configuring the first telematics device to reduce the first rate at which asset travel data is transmitted to the remote server depending on a power level of the battery. This may be used to preserve any remaining battery power (e.g. a "low power" mode).

Some general features will now be described that apply equally to any of the embodiments described hereinabove.

The first and second telematics devices will be understood to include at least the necessary electronic components to enable a telematics function. In particular, the first and second telematics devices may each comprise a GPS sensor (or any other global navigation satellite system (GNSS) receiver, or equivalent location determining device), a processor arranged to create travel data based on measurements from the GPS sensor, and a transceiver configured to receive travel data from the processor and to transmit travel data to the remote server. Further electronic components, such as the sensors described above, may be included the first and second telematics devices.

The first and second telematics devices are carried by the asset and vehicle, respectively, in any suitable manner that enables the telematics device to monitor travel data. In some embodiments the first telematics device is a mobile device carried by the asset. In some embodiments the first telematics device is a fixed device carried by the asset, for example the first telematics device may be plugged into an On-Board Diagnostics (OBD) port. The fixed device may include mechanical and/or electrical mounting means (e.g. for connecting to the power supply from an onboard battery). While the second telematics device may possibly be a mobile device located in the vehicle, preferably the second telematics device is a fixed device in the vehicle, for example the second telematics device may be plugged into an On-Board Diagnostics (OBD) port or even integrated with the on-board vehicle computer. The fixed device may include mechanical and/or electrical mounting means (e.g. for connecting to the power supply from the vehicle battery). The first/second telematics device being a fixed device means that it is not intended to be regularly removed and carried by a user in the form of a mobile device, however the fixed device may still be installable and removable rather than being a permanent fixture in the asset/vehicle. In other words, the first/second telematics device may be manufactured by a third party and installed in an asset/vehicle subsequent to its manufacture, for example as part of a fleet management system. The first/second telematics device can therefore be distinguished from any onboard data processing systems installed by the asset/vehicle manufacturer. In various examples, the first and/or second telematics device may comprise one of the LINK tracking devices available from Webfleet Solutions B.V.

There is disclosed herein various methods and systems for determining a coupling between an asset and a vehicle capable of transporting the asset. It will be understood that this coupling can be a physical coupling e.g. a trailer hitched to a truck, or a temporary association e.g. a piece of equipment being transported by or together with a vehicle in any suitable way. Most generally, a coupling means that the asset and vehicle are travelling together such that the asset follows the vehicle. Some examples of assets that may be transported by a vehicle include trailers, cargo units, equipment, or other vehicles, whether transported externally and/or internally of the vehicle.

BRIEF DESCRIPTION OF THE DRAWINGS

One or more non-limiting examples will now be described, by way of example only, and with reference to the accompanying figures in which.

DETAILED DESCRIPTION OF PREFERRED EMBODIMENTS

Figure 1:
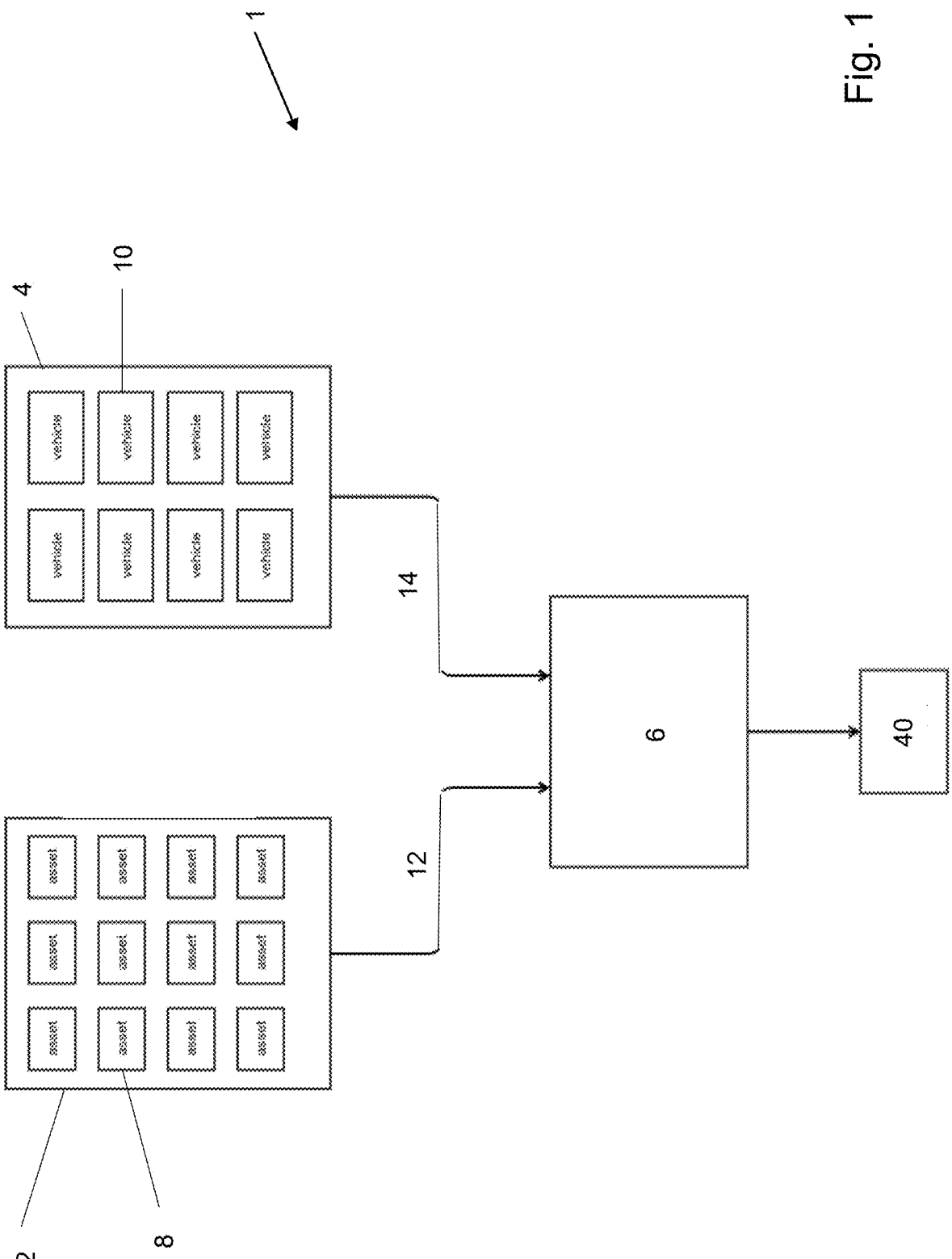
FIG. 1 is a schematic overview of an asset tracking system in accordance with an embodiment of the present invention.

As shown in FIG. 1, an asset tracking system 1 comprises a plurality of assets 2, a plurality of vehicles 4 and a remote server 6, each asset carrying a first telematics device 8 and each vehicle carrying a second telematics device 10. The first and second telematics devices 8, 10 are each independently in communication with the server 6. The assets 2 may be trailers or equipment carried by trailers and the vehicles 4 may be trucks.

The first and second telematics devices 8, 10 send asset travel data 12 and vehicle travel data 14, respectively, to the remote server 6 at regular intervals. The asset and vehicle travel data 12, 14 may include time stamps, one or more travel parameters for each time stamp, and vehicle/asset status data. The vehicle travel data 14 sent from each second telematics device 10 is sent at a higher rate than the asset travel data 12 sent from each first telematics device 8. The server 6 then compares the asset travel data 12 to the vehicle travel data 14 to determine a coupling between one or more of the plurality of assets 2 and one of the plurality of vehicles 4. For example, it may be determined when a given vehicle 4 is coupled with a trailer (first asset 2) and a piece of equipment such as a bulldozer (second asset 2) being carried by the trailer.

The server 6 can outputs its coupling (or decoupling) determination and travel data 12, 14 to a remote output terminal 40, for example to enable a fleet manager to track the assets 2 and vehicles 4.

Figure 2:
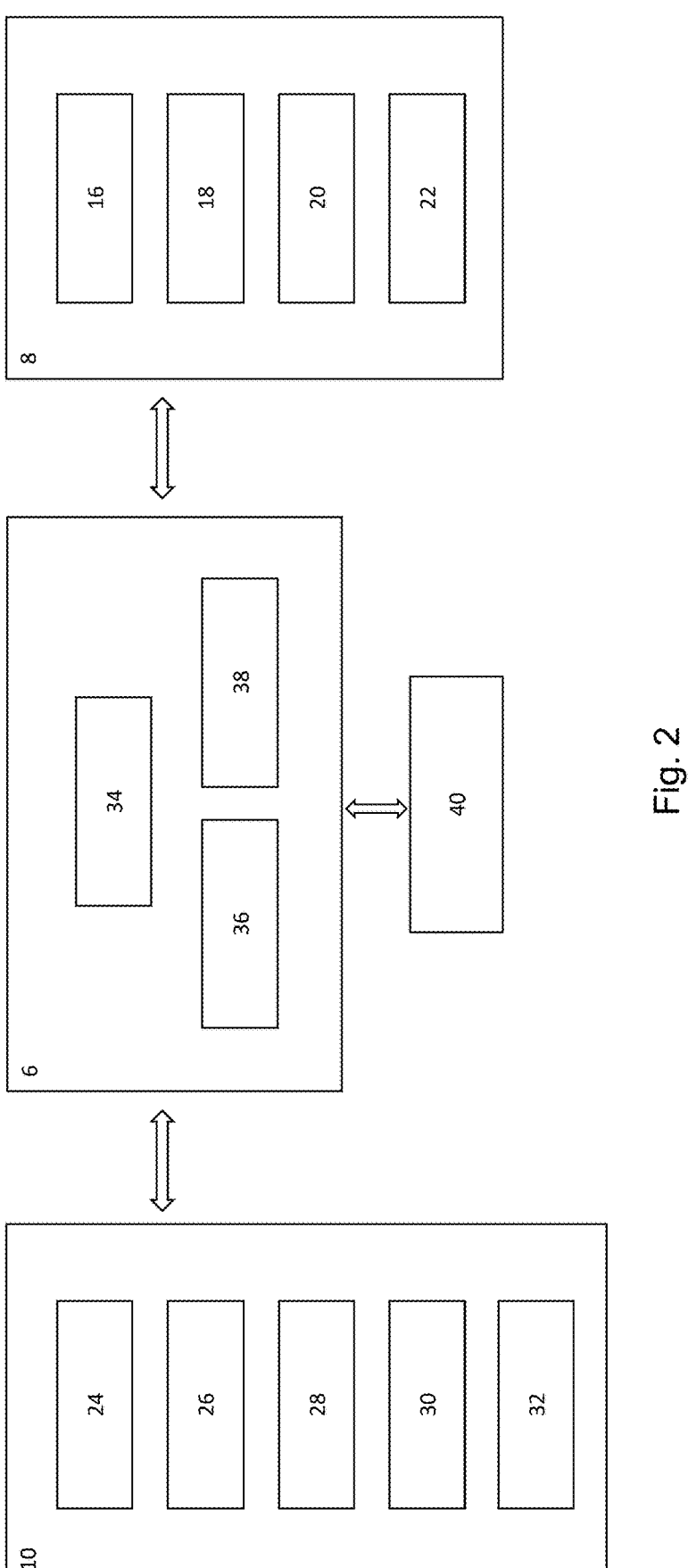
FIG. 2 is a schematic illustration of the electronic components arranged within the devices and server of such an asset tracking system.

FIG. 2 is a schematic illustration of the electronic components arranged within the telematics devices 8, 10 and remote server 6 of the asset tracking system 1. Each asset telematics device 8 includes a transceiver 16, processor 18, memory 20 and battery 22. Each vehicle telematics device 10 includes a transceiver 24, processor 26, memory 28, a power input port 30 and a buffer 32. The processors 18, 26 provide the travel data 12, 14 to be transmitted to the server 6. The processors 18, 26 may therefore include or be part of a GPS sensor, as is well-known in the field of telematics. The server 6 includes a processor 34, communications device 36 and memory 38. The server 6 is also connected to the remote output terminal 40. The transceivers 16, 24 of the asset 8 and vehicle 10 telematics devices may, for example, be radio transceivers configured to send asset and vehicle travel data 12, 14 to the remote server communications device 36. The processor 34 then compares the travel data 12, 14 of the plurality of assets 2 and vehicles 4 to determine couplings between assets 2 and vehicles 4. The travel data 12, 14 is output to a remote output terminal 40 which displays the positions of the assets 2 and vehicles 4, and any determined couplings between the assets 2 and vehicles 4.

Each asset telematics device 8 and vehicle telematics device 10 may establish a "mobile" or telecommunications network connection with the communications device 36 through a network service provider. The network connection can be established in a known manner, utilizing any number of communication standards such as LTE (4G), GSM (3G & 2G), CDMA (3G & 2G), WAN, etc.

The vehicle telematics device 10 has a connection to an external power source via the power input port 30 and the asset telematics device 8 is powered by a battery 22. The asset transceiver 16 does not therefore transmit asset travel data 12 as frequently as the vehicle transceiver 24 transmits vehicle travel data 14 in order to conserve the life of the battery 22 and prolong the time until it needs to be recharged.

The comparison of the travel parameters of the asset travel data 12 and vehicle travel data 14 is triggered when the server 6 receives the less frequent asset travel data 12 from the asset telematics device 8. As the asset travel data 12 will have a time stamp, the processor 34 of the server 6 processes the vehicle travel data 14 to determine the travel parameters of the vehicle travel data 14 at a time which matches the time stamp of the received asset travel data 12.

The processor 34 determines a coupling between an asset 2 and vehicle 4 using one or more appropriate algorithms. There are different ways to compare the asset and vehicle travel data 12, 14 in order to determine if the asset 2 and vehicle 4 are coupled. In one example, described in more detail below, interpolation is used to match the time stamps of the asset and vehicle travel data 12, 14.

Figure 3:
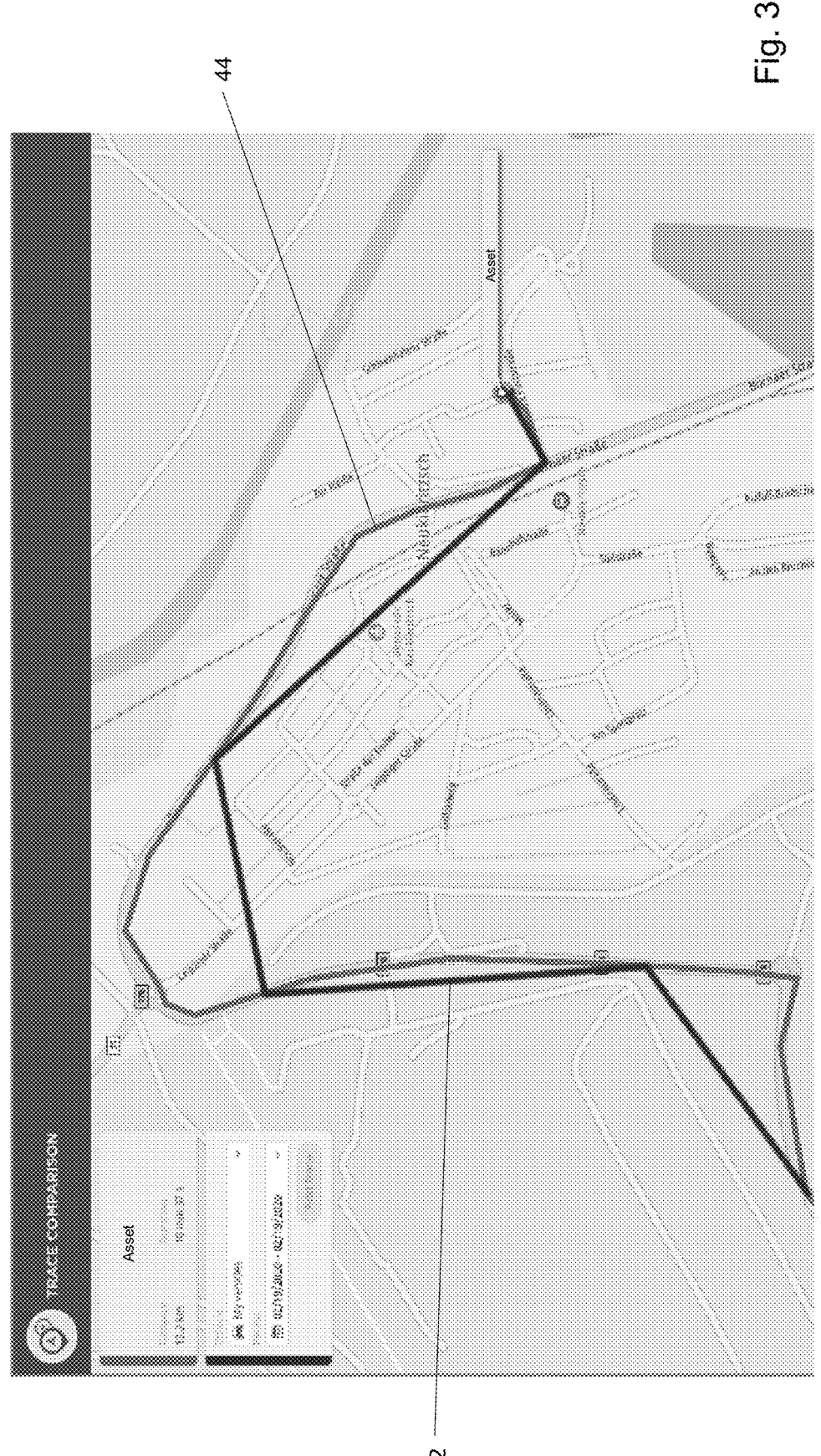
FIG. 3 shows the travel paths on a map for a vehicle and an asset being tracked by such a system.

The asset and vehicle travel data 12, 14 comprises a plurality of travel data points, which include position and speed in this example. These position travel data points can be joined to form a track which shows the travel path the asset 2 or vehicle 4 is taking. FIG. 3 shows the asset track 42 and the vehicle track 44. The processor 34 of the server 6 runs suitable algorithms to assess the similarity of the asset and vehicle tracks 42, 44, resulting in a similarity score. For example, similarity scores may be assigned to multiple pairs of vehicle and assets in order for the processor 34 to determine which one(s) of the assets 2 is coupled to a given vehicle 4. For example, the similarity score may be compared to a predetermined threshold to determine a coupled or decoupled status.

Figure 4:
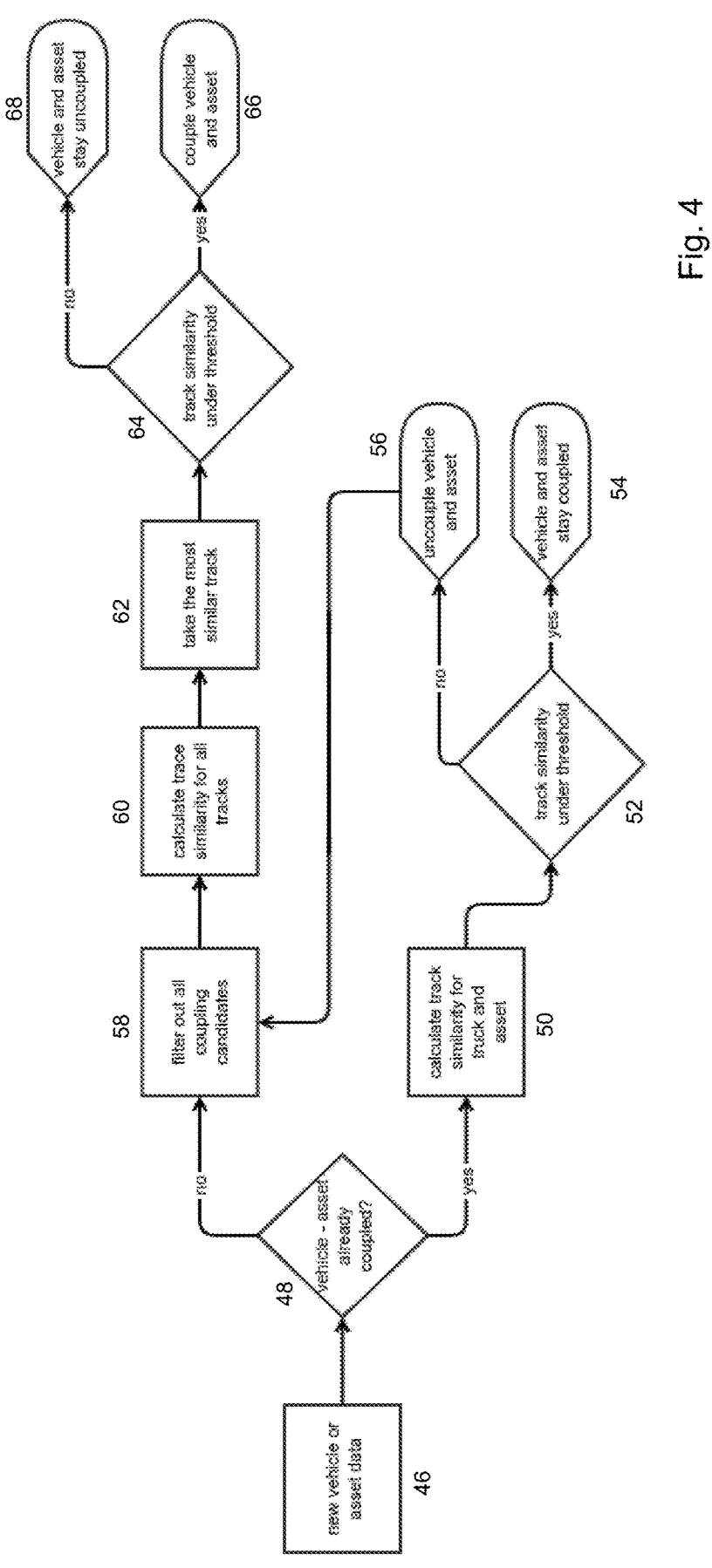
FIG. 4 is an overview of an exemplary coupling determination algorithm.

FIG. 4 depicts a flow diagram of a method of determining if an asset 2 and vehicle 4 are coupled. The method includes receiving new vehicle or asset travel data 12, 14, as shown in block 46. This new vehicle or asset travel data 12, 14 comprises a plurality of travel data points, and each travel data point comprises at least a time stamp and one or more travel parameters. In some examples, each travel data point comprises multiple travel parameters including at least position and instantaneous speed, however multiple other travel parameters may be included, such as road inclination, acceleration or ambient temperature/light levels. The processor then checks if the asset 2 or vehicle 4 is already coupled to an asset 2 or vehicle 4 in block 48. If the asset 2 and vehicle 4 are already coupled, then the track similarity is calculated for the asset and vehicle tracks 42, 44 in block 50. If this similarity is under the threshold similarity for a coupling to be determined then the asset 2 and vehicle 4 remain coupled, in block 54. If the similarity is no longer under the threshold, the asset 2 and vehicle are uncoupled, in block 56. A similarity score may be employed.

If an asset 2 and vehicle 4 are uncoupled then the method involves filtering out all coupling candidates, at block 58. This may be done by determining a radius around the asset 2 in which the vehicles 4 are most likely to be the vehicles 4 to which the asset 2 is coupled. The method then involves, at block 60, calculating the similarity between the asset track 42 and vehicle track 44 for all assets 2 and vehicles 4 which are coupling candidates. The asset rack 42 and vehicle track 44 comprise both position and instantaneous speed data. At block 62, the method then involves choosing the most similar asset and vehicle track 42, 44 and checking if this similarity is under the threshold at block 64. If it is, then the asset 2 and vehicle 4 are coupled, at block 66. If not, then the asset 2 and vehicle 4 remain uncoupled, at block 68.

When the processor 32 has determined that a particular asset 2 and vehicle 4 are coupled, it communicates with the asset telematics device 8 such that the asset telematics device 8 reduces the rate at which asset travel data 12 is sent to the server 6. This increases the lifetime of the battery 22 which is used to power the asset telematics device 8.

Figures 5A, 5B:
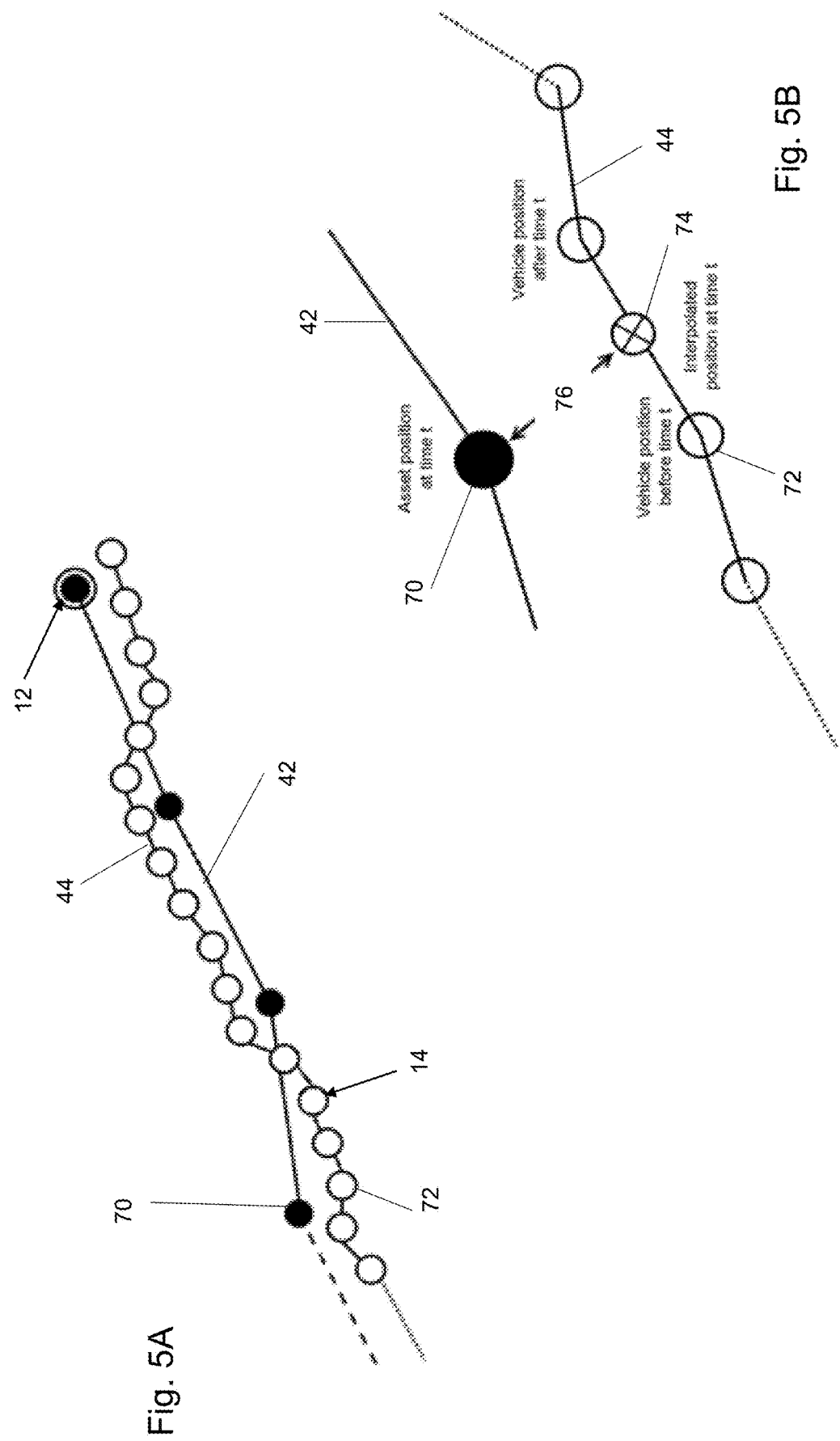
FIGS. 5A to 5C schematically depict one exemplary interpolation technique being applied to vehicle travel data.
Figure 5C:
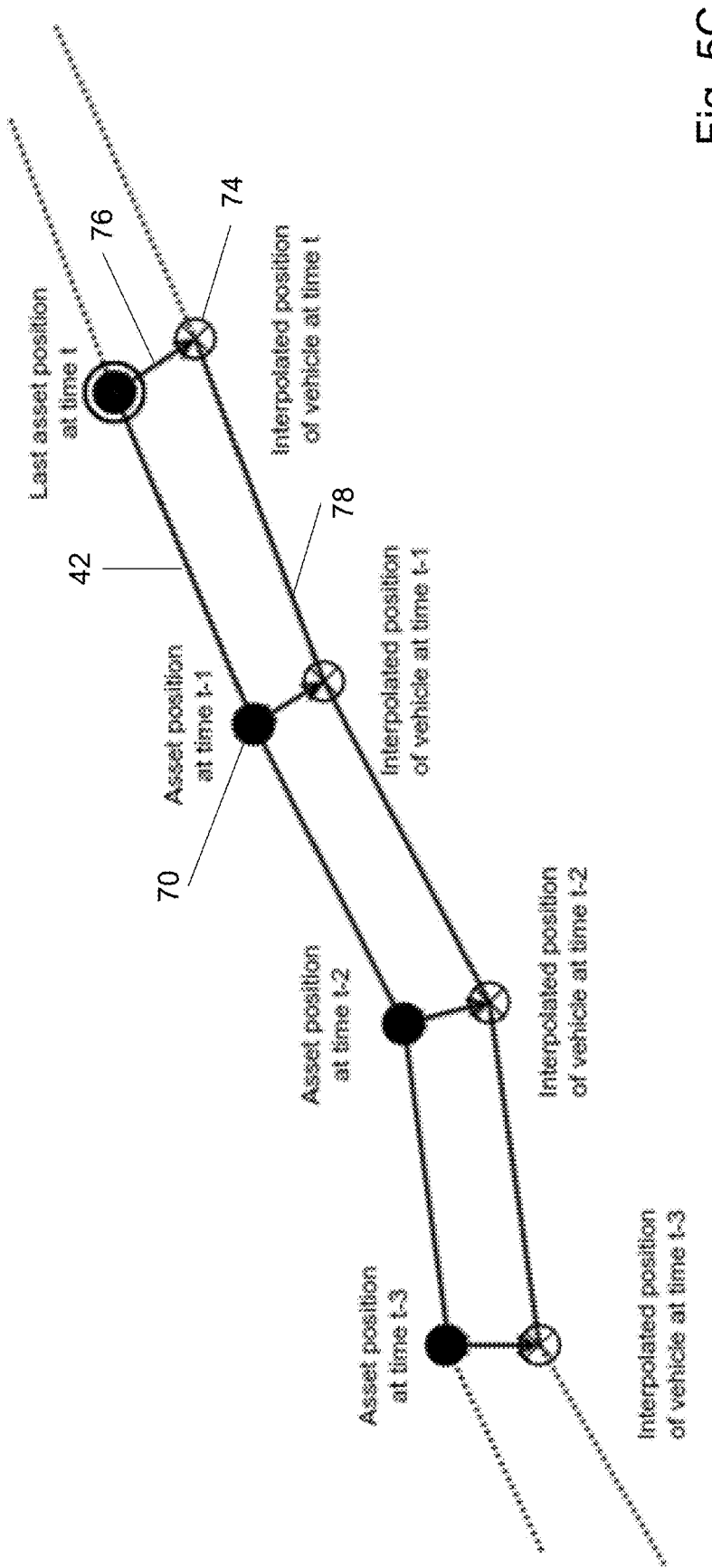

FIG. 5A shows a plurality of asset travel data points 70 and vehicle travel data points 72 with the asset and vehicle tracks 42, 44 joining the data points 70, 72. The asset travel data points 70 and vehicle travel data points 72 comprise at least a time stamp, position data, and instantaneous speed data. Additional travel parameters such as road inclination may also be included in the data points 70, 72. FIG. 5B shows how an interpolated vehicle data point 74 is determined for the vehicle travel data 12. An interpolated distance 76 is then calculated between the most recent asset travel data point 70 and the interpolated vehicle data point 74. This interpolated distance may be the distance between the positions of the vehicle and asset, or it may be an integrated distance obtained from the difference in instantaneous speed between the asset and vehicle. This interpolated distance 76 is calculated for multiple asset travel data points 70, as shown in FIG. 5C. This forms an interpolated vehicle track 78 which is used when calculating the track similarity, as in the method shown in FIG. 4.

The vehicle telematics device 10 may be configured to store the vehicle travel data in the memory 28 and to periodically transmit a message to the remote server 6 comprising a plurality of travel data points for the vehicle 4. Hence a number (e.g. six) of the vehicle travel data points 72 may be bundled together in a single transmission message. Whenever the server 6 receives a new message from the vehicle 4, the interpolation can be repeated to update the similarity score.

In the illustration given by FIG. 5B, an interpolated distance 76 is used as the basis for a similarity score between the asset and vehicle tracks 42, 44. Rather than taking this single distance 76, the distance between the tracks 42, 44 may be averaged for a plurality of asset travel data points 70 in order to determine a more accurate similarity score. For example, the distance 76 may be averaged within a time window T encompassing at least the last three asset travel data points 70. A time window T having a fixed length, e.g. of 30-60 minutes, may be applied and shifted along the vehicle track 44 as more travel data is received. Such averaging may take a weighted average of the distance 76 for more recent travel data points 70 within the time window T.

Figure 6A:
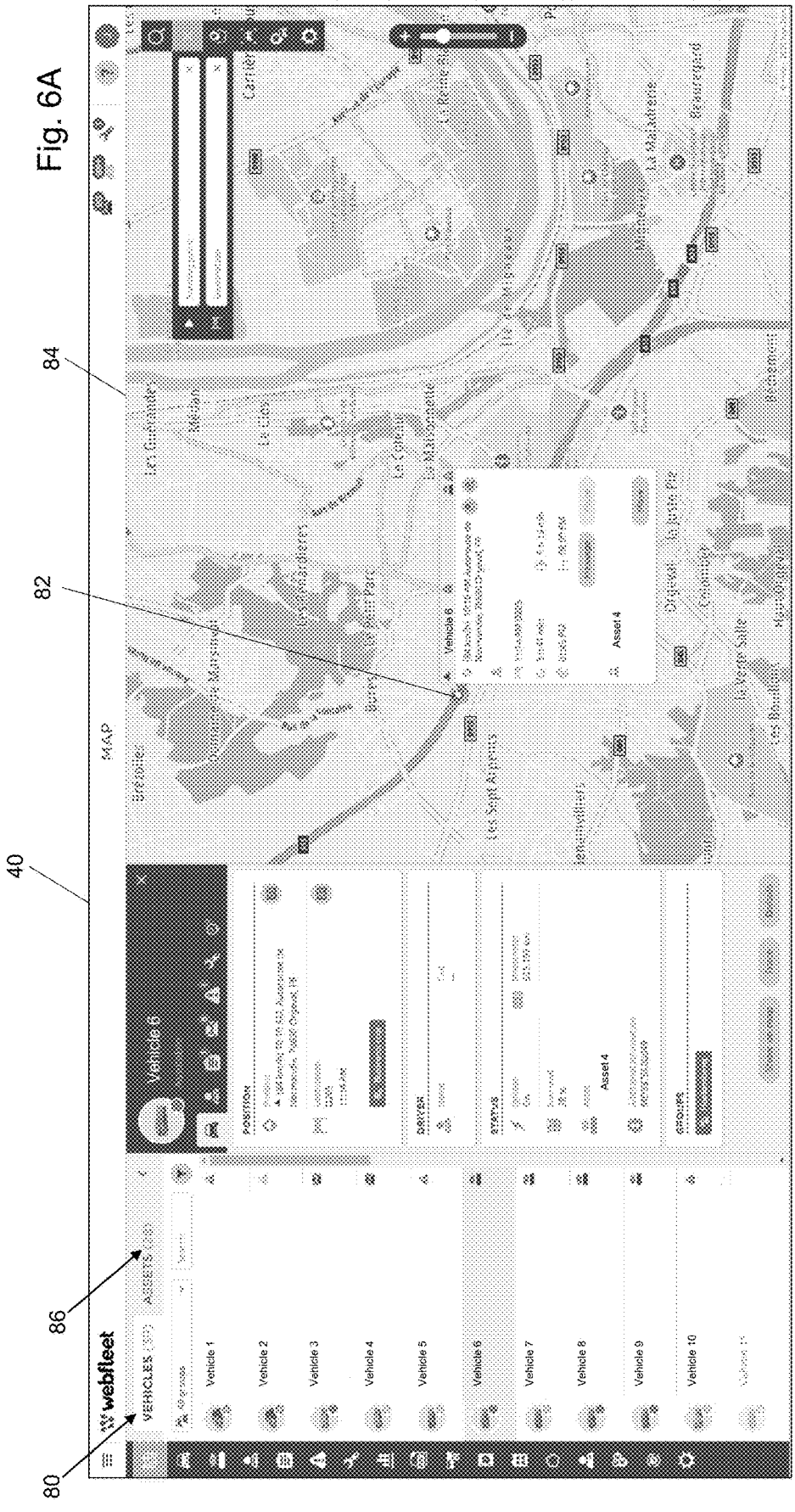
FIGS. 6A to 6D show examples of display outputs on a fleet operator terminal.
Figure 6B:
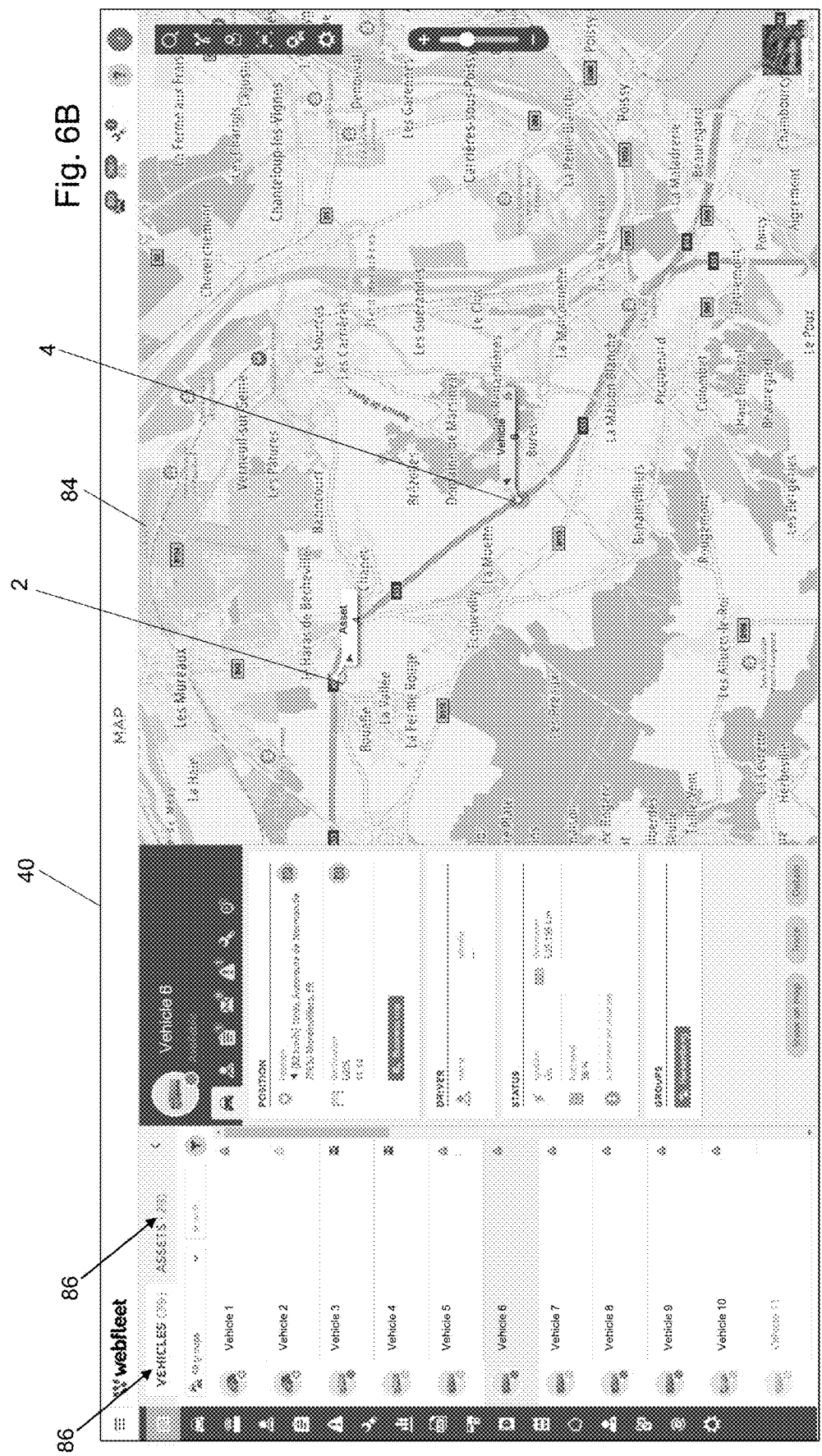
Figure 6C:
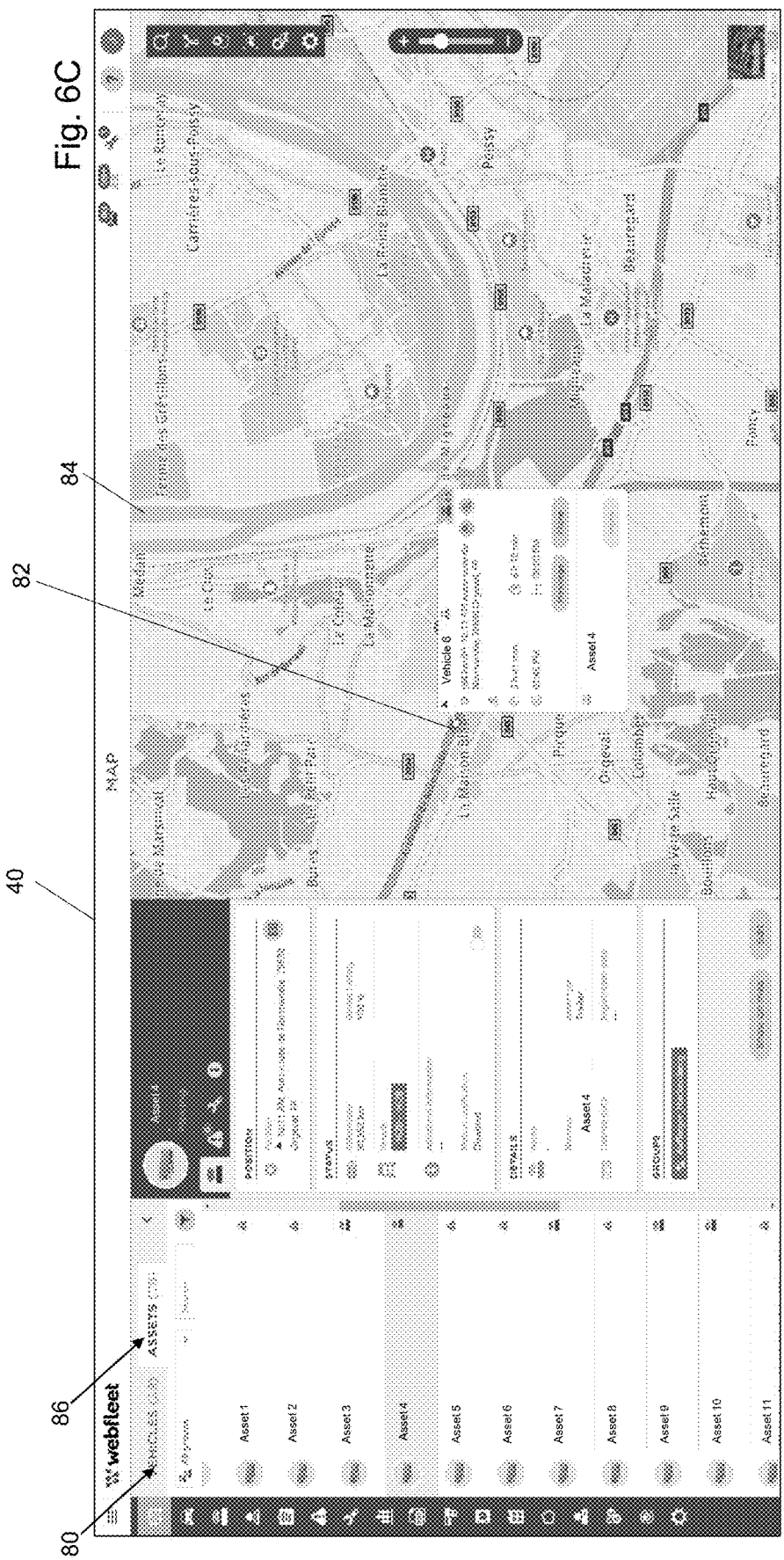
Figure 6D:
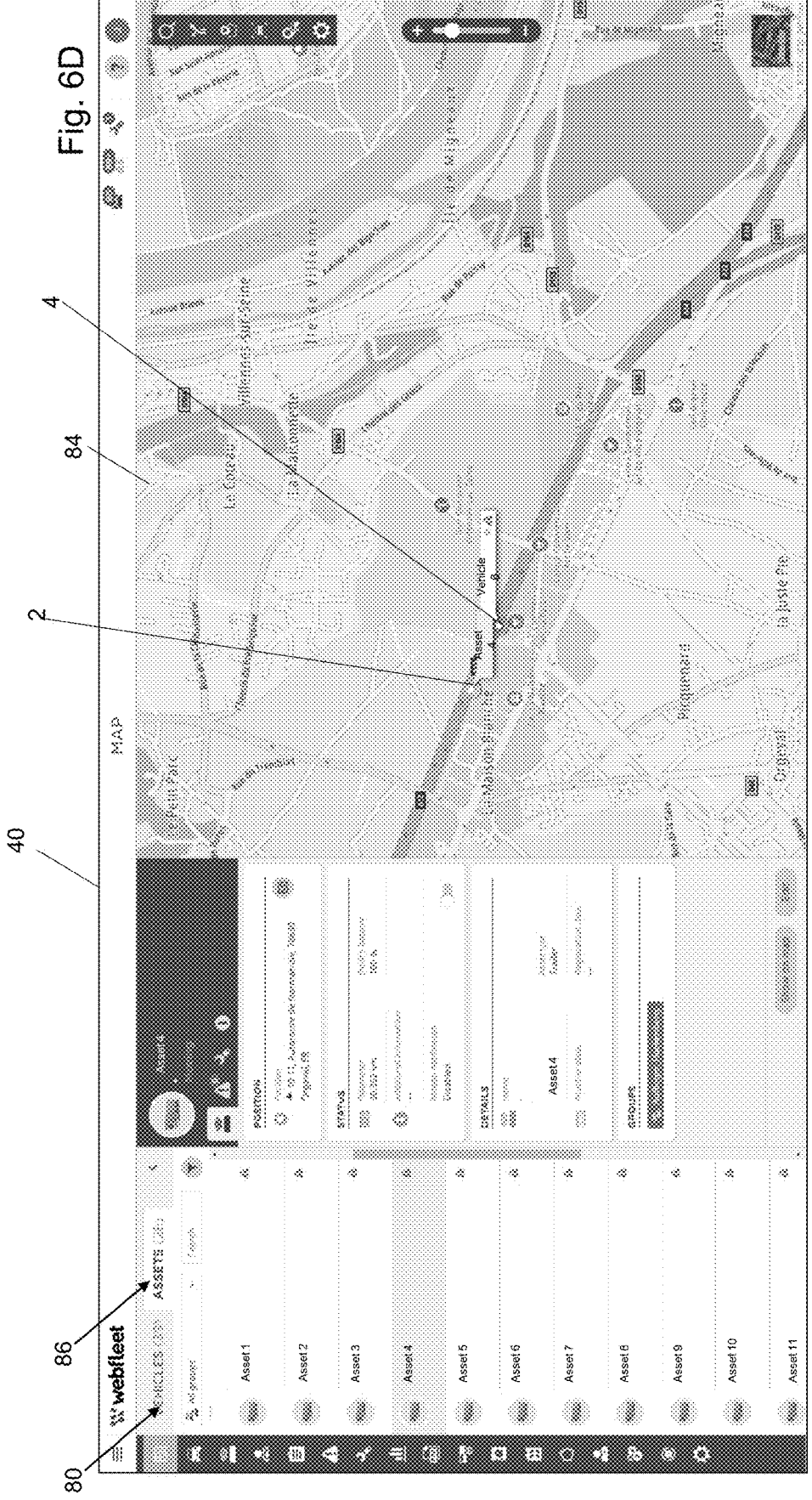

FIGS. 6A-D show a display on the remote output terminal 40 which the fleet manager can use to track the locations of their fleet of assets 2 and vehicles 4, as well as see which assets 2 and vehicles 4 are coupled together. The remote output terminal 40 displays the positions of the plurality of assets 2 and vehicles 4 on a map to enable a fleet manager to easily track the position of their fleet. FIG. 6A shows the vehicle fleet 80, where the server 6 has determined that an asset 2 and vehicle 4 are coupled and this is shown as a coupled asset-vehicle data point 82 on the map 84. FIG. 6B shows the vehicle fleet 80 with an uncoupled asset 2 and vehicle 4 on the map 84. Different vehicles 4 can be selected from the vehicle fleet 80 to track the location of any vehicle 4 in the fleet. FIG. 6C shows the asset fleet 86, where the server 6 has determined than an asset 2 and vehicle 4 are coupled. This is shown as a coupled asset-vehicle data point 82 on the map 84. FIG. 6D shows the asset fleet 86 with an uncoupled asset 2 and vehicle 4. Different assets 2 can be selected from the asset fleet 86 to track the location of any asset 2 in the fleet.

Figure 7:
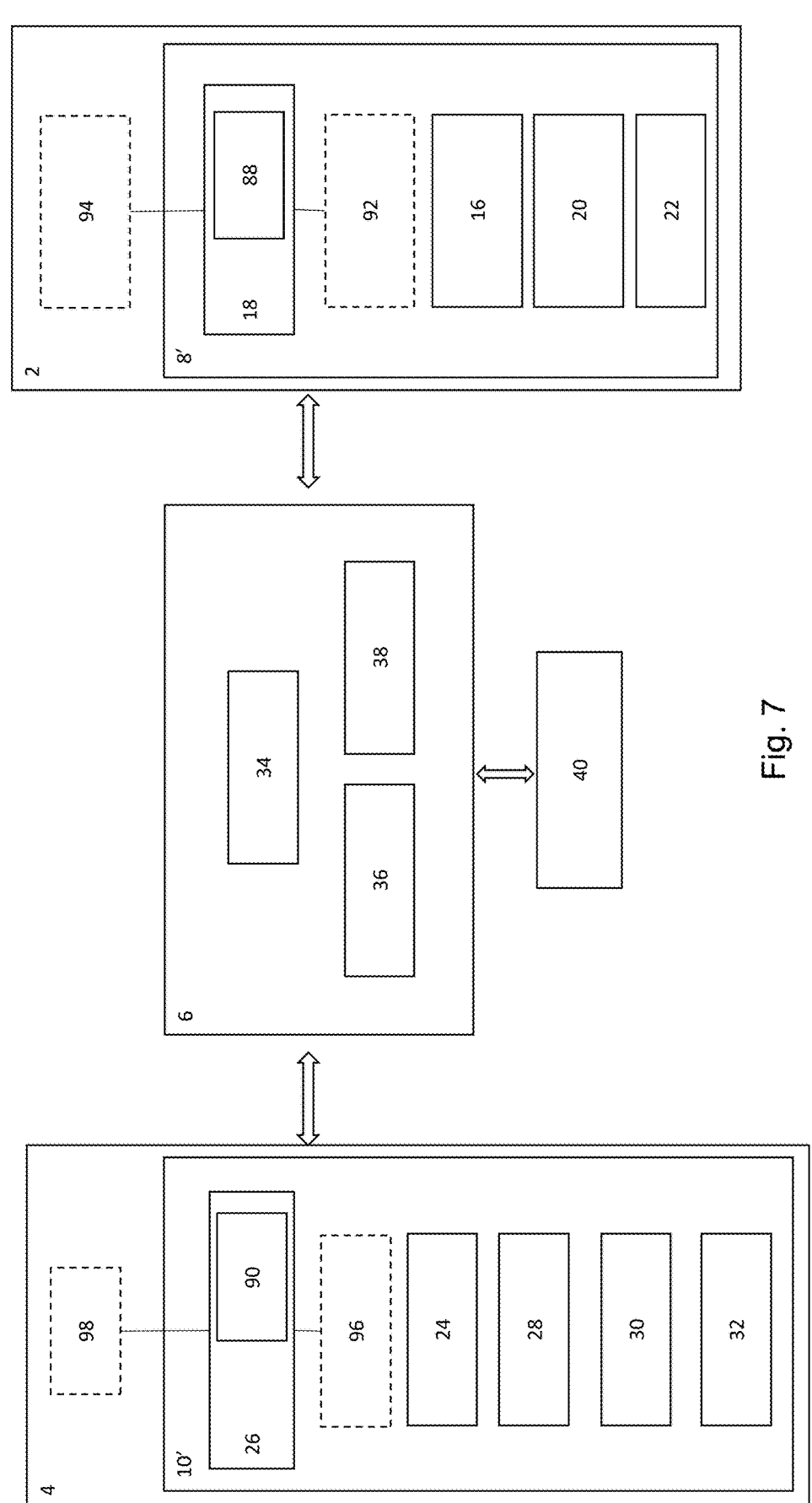
FIG. 7 is a schematic illustration of the electronic components arranged within and connected to the telematics devices in communication with a server according to another embodiment of an asset tracking system.

FIG. 7 is a schematic illustration of the electronic components arranged within a further embodiment of the telematics devices 8', 10' and remote server 6 of the asset tracking system 1. Each asset telematics device 8' includes a transceiver 16, processor 18 linked to a GPS sensor 88, a memory 20, and an optional battery 22. The processor 18 is arranged to receive at least position data of the asset 2 from the GPS sensor 88. The GPS sensor 88 may also provide instantaneous speed data for the asset 2 to the processor 18. The asset telematics device 8' may optionally further include an additional sensor 92 which provides one or more additional travel parameters to the processor 18, such as an IMU to provide instantaneous acceleration data and/or information about the inclination (i.e. motion-related travel parameters) and/or road orientation and/or magnetic field readings (i.e. environment-related parameters) for the asset at any given instant in time.

An optional external sensor 94 may be mounted in or to the asset 2 and connected to the processor 18 of the telematics unit 8'. The external sensor 94 may be a speed sensor, e.g. coupled to the external body of the asset 2, such as a wheel speed sensor connected to the axle or wheels of the asset 2. The external sensor 94 may be an accelerometer or IMU if the telematics unit 8' does not include one as an internal sensor 92. The external sensor 94 may be arranged to measure one or more environment-related parameters such as temperature or ambient light level.

Each vehicle telematics device 10' includes a transceiver 24, a processor 26 associated with a GPS sensor 90, a memory 28, a vehicle power and/or data input port 30, and an optional buffer 32. As with the GPS sensor 88, the GPS sensor 90 provides at least position data for the vehicle 4 to the processor 26, and may also provide instantaneous speed data for the vehicle 4 to the processor 26. The vehicle telematics device 10' may optionally further include an additional sensor 96 which provides one or more additional travel parameters to the processor 26, such as an IMU to provide instantaneous acceleration data and/or information about the inclination (i.e. motion-related travel parameters) and/or road orientation and/or magnetic field readings (i.e. environment-related travel parameters) for the vehicle at any given instant in time.

An optional external sensor 98 may be mounted in or to the vehicle 4 and connected to the processor 26 of the telematics unit 10'. Such an external sensor 98 may be coupled to the external body of the vehicle 4, such as a wheel speed sensor connected to the axle or wheels of the vehicle 4. The external sensor 98 may be an accelerometer or IMU if the telematics unit 10' does not include one as an internal sensor 96. The external sensor 98 may be arranged to measure one or more environment-related parameters such as temperature or ambient light level.

As well as, or instead of the sensor 98, the data input port 30 may be connected to a vehicle CAN bus or to the engine control unit (ECU), e.g. via an OBD port in the vehicle 4. One or more instantaneous travel parameters (such as vehicle speed, acceleration, temperature, etc.) may obtained via the data input port 30.

The server 6 includes a processor 34, communications device 36 and memory 38. The server 6 is also connected to the remote output terminal 40. The transceivers 16, 24 of the asset 8' and vehicle 10' telematics devices may, for example, be radio transceivers configured to send asset and vehicle travel data to the remote server communications device 36. The processor 34 then compares the travel data of the plurality of assets 2 and vehicles 4 to determine couplings between assets 2 and vehicles 4. The travel data is output to a remote output terminal 40 which displays the positions of the assets 2 and vehicles 4, and any determined couplings between the assets 2 and vehicles 4. The travel data provided by the asset telematics device 8 and vehicle telematics device 10 includes a time stamp, position and at least one further motion-related parameter (such as instantaneous speed or acceleration), and optionally other instantaneous travel parameters relating to the travel environment of the asset and vehicle, such as road inclination. For example the sensors 92, 94, 96, 98 may include an IMU to enable the telematics devices 8', 10' to measure instantaneous road inclination. The sensors 92, 94, 96, 98 may also include, in addition or alternatively, a sensing function for other parameters relating to the travel environment, such as ambient temperature, humidity, light levels, etc. Other types of possible sensors 92, 94, 96, 98 include a compass to determine the heading of the vehicle 4, or asset 2, or a magnetometer to determine the local magnetic field of the vehicle 4 and/or asset 2. Data relating to additional environment- or motion-related travel parameters not disclosed here may also be collected by the sensors 92, 94, 96, 98 and any of these additional motion- or environment-related travel parameters may also be used to determine a coupling between the asset 2 and vehicle 4.

The processor 34 determines a coupling between an asset 2 and vehicle 4 using one or more appropriate algorithms, such as the interpolation method previously described. The similarity score may be compared to a predetermined threshold to determine a coupled or decoupled status.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A method of determining a coupling between an asset and a vehicle from among a plurality of different vehicles capable of transporting the asset, wherein the asset is carrying a first telematics device and the vehicle is carrying a second telematics device, the method comprising:

gathering asset travel data from one or more sensors associated with the asset, the asset travel data comprising a plurality of asset travel data points, each asset travel data point comprising an asset time stamp and multiple asset travel parameters associated with the asset time stamp, wherein the multiple asset travel parameters comprise at least asset position and asset speed;

gathering vehicle travel data from one or more sensors associated with the vehicle, the vehicle travel data comprising a plurality of vehicle travel data points, each vehicle travel data point comprising a vehicle time stamp and multiple vehicle travel parameters associated with the vehicle time stamp, wherein the multiple vehicle travel parameters comprise at least vehicle position and vehicle speed;

configuring the first telematics device to transmit the asset travel data to a remote server;

configuring the second telematics device to transmit the vehicle travel data to the remote server;

wherein the first telematics device is configured to transmit the asset travel data to the remote server independently of the second telematics device; and wherein the second telematics device is configured to transmit the vehicle travel data to the remote server independently of the first telematics device;

at each asset time stamp, the following steps being carried out at the remote server:

comparing the asset position, associated with the time stamp, from the asset travel data to the vehicle position, associated with the time stamp, from the vehicle travel data;

comparing the asset speed, associated with the time stamp, from the asset travel data to the vehicle speed, associated with the time stamp, from the vehicle travel data;

determining a coupling between the asset and the vehicle based on the similarity of the asset position and the vehicle position at one or more time stamps, and based on the similarity of the asset speed and the vehicle speed at the one or more time stamps;

generating signals for displaying and updating a live map on a display device visually indicating relative positions of at least the asset and the plurality of different vehicles, and the determined coupling between the asset and the vehicle.

2. The method of claim 1, wherein the speed comprises an instantaneous speed of the vehicle or asset obtained at the time stamp.

3. The method of claim 1, wherein the first telematics device is configured to transmit asset travel data to the remote server at a first rate; and the second telematics device is configured to transmit vehicle travel data to the remote server at a second rate, the second rate being higher than the first rate.

4. The method of claim 1, further comprising: comparing the multiple travel parameters of the asset at a given time stamp of the asset travel data by processing the vehicle travel data to interpolate or estimate the same multiple travel parameters of the vehicle at a point in time matching the given time stamp of the asset travel data.

5. The method of claim 1, further comprising: obtaining an instantaneous travel parameter relating to the travel environment of the asset and obtaining the same instantaneous travel parameter relating to the travel environment of the vehicle, each travel data point further comprising the instantaneous travel parameter as one of the multiple travel parameters associated with the time stamp.

6. The method of claim 5, wherein the instantaneous travel parameter is chosen from: temperature, ambient light level, road inclination, or a magnetic field reading.

7. The method of claim 5, wherein the first telematics device comprises a first sensor arranged to measure the instantaneous travel parameter relating to the travel environment of the asset and/or the second telematics device comprises a second sensor arranged to measure the instantaneous travel parameter relating to the travel environment of the vehicle.

8. The method of claim 1, wherein the first and second telematics devices each comprise an inertial measurement unit, and the method further comprises using the inertial measurement unit to measure a first instantaneous inclination of the road on which the asset is travelling and a second instantaneous inclination of the road on which the vehicle is travelling, each travel data point further comprising the first or second instantaneous inclination as one of the multiple travel parameters associated with the time stamp.

9. The method of claim 1, wherein comparing the asset travel data to the vehicle travel data, at the remote server, is triggered by the remote server receiving vehicle travel data from the second telematics device.

10. The method of claim 1, wherein the remote server is arranged to store asset travel data and vehicle travel data as historical data, and wherein comparing the asset travel data to the vehicle travel data, at the remote server, includes comparing historical asset travel data to historical vehicle travel data.

11. The method of claim 1, further comprising:

configuring the second telematics device to store the vehicle travel data and to periodically transmit a message to the remote server comprising a plurality of travel data points for the vehicle; and/or configuring the first telematics device to transmit to the remote server each travel data point for the asset contemporaneously with its time stamp.

12. The method of claim 1, further comprising: determining the coupling between the asset and the vehicle from among the plurality of different vehicles by comparing the asset travel data to the vehicle travel data for each of the plurality of different vehicles and comparing the multiple travel parameters at a given time stamp to determine a similarity score for each of the plurality of different vehicles.

13. A server for determining a coupling between an asset and a vehicle from among a plurality of different vehicles capable of transporting the asset, wherein the asset is carrying a first telematics device configured to transmit asset travel data to the server and the vehicle is carrying a second telematics device configured to transmit vehicle travel data to the server;

wherein the server is configured to gather asset travel data from one or more sensors associated with the asset, the asset travel data comprising a plurality of asset travel data points, each asset travel data point comprising an asset time stamp and multiple asset travel parameters associated with the asset time stamp, wherein the multiple asset travel parameters comprise at least asset position and asset speed;

wherein the server is further configured to gather vehicle travel data from one or more sensors associated with the vehicle, the vehicle travel data comprising a plurality of vehicle travel data points, each vehicle travel data point comprising a vehicle time stamp and multiple vehicle travel parameters associated with the vehicle time stamp, wherein the multiple vehicle travel parameters comprise at least vehicle position and vehicle speed;

wherein the first telematics device is configured to transmit the asset travel data to the remote server independently of the second telematics device;

wherein the second telematics device is configured to transmit the vehicle travel data to the remote server independently of the first telematics device;

wherein the server comprises at least one processor configured to determine if a time interval between the asset travel data points is lower than a predetermined threshold, and i) when the time interval is lower than the predetermined threshold, to, at a given asset or vehicle time stamp:

compare the asset position, associated with the time stamp, from the asset travel data to the vehicle position, associated with the time stamp, from the vehicle travel data to calculate a similarity of the asset position and the vehicle position;

compare the asset speed, associated with the time stamp, from the asset travel data to the vehicle speed, associated with the time stamp, from the vehicle travel data to calculate a similarity of the asset speed and the vehicle speed; and determine a coupling between the asset and the vehicle based on the similarity of the asset position and the vehicle position at one or more time stamps, and based on the similarity of the asset speed and the vehicle speed at the one or more time stamps; and generate signals for displaying and updating a live map on a remote display terminal visually indicating relative positions of at least the asset and the plurality of different vehicles, and the determined coupling between the asset and the vehicle;

ii) when the time interval is not lower than the predetermined threshold, to, at a given asset or vehicle time stamp:

compare the asset position, associated with the time stamp, from the asset travel data to the vehicle position, associated with the time stamp, from the vehicle travel data to calculate a similarity of the asset position and the vehicle position;

to determine a coupling between the asset and the vehicle based on the similarity of the asset position and the vehicle position; and generate signals for displaying and updating the live map on a remote display terminal visually indicating relative positions of at least the asset and the plurality of different vehicles, and the determined coupling between the asset and the vehicle.

14. An asset tracking system comprising a server, one or more first telematics devices each carried by an asset, one or more sensors associated with the asset, one or more second telematics devices each carried by a vehicle of a plurality of vehicles capable of transporting an asset, and one or more sensors associated with the vehicle;

wherein the server is configured to gather asset travel data from the one or more sensors associated with the asset, the asset travel data comprising a plurality of asset travel data points, each asset travel data point comprising an asset time stamp and multiple asset travel parameters associated with the asset time stamp, wherein the multiple asset travel parameters comprise at least asset position and asset speed;

wherein the server is configured to gather vehicle travel data from the one or more sensors associated with the vehicle, the vehicle travel data comprising a plurality of vehicle travel data points, each vehicle travel data point comprising a vehicle time stamp and multiple vehicle travel parameters associated with the vehicle time stamp, wherein the multiple vehicle travel parameters comprise at least vehicle position and vehicle speed;

wherein each first telematics device is configured to transmit the asset travel data to the server independently of each second telematics device, and each second telematics device is configured to transmit the vehicle travel data to the server independently of each first telematics device;

wherein the server comprises at least one processor configured to determine if a time interval between asset travel data points is lower than a predetermined threshold, and, i) when the time interval is lower than the predetermined threshold, to, at a given asset or vehicle time stamp:

compare the asset position, associated with the time stamp, from the asset travel data to the vehicle position, associated with the time stamp, from the vehicle travel data;

compare the asset speed, associated with the time stamp, from the asset travel data to the vehicle speed, associated with the time stamp, from the vehicle travel data; and determine a coupling between the asset and the vehicle based on the similarity of the asset position and the vehicle position at one or more time stamps, and based on the similarity of the asset speed and the vehicle speed at the one or more time stamps; and generate signals for displaying and updating a live map on a remote display terminal visually indicating relative positions of at least the asset and the plurality of different vehicles, and the determined coupling between the asset and the vehicle;

ii) when the time interval is not lower than the predetermined threshold, to, at a given asset or vehicle time stamp:

compare the asset position, associated with the time stamp, from the asset travel data to the vehicle position, associated with the time stamp, from the vehicle travel data;

determine a coupling between the asset and the vehicle based on the similarity of the asset position and the vehicle position; and generate signals for displaying and updating a live map on a remote display terminal visually indicating relative positions of at least the asset and the plurality of different vehicles, and the determined coupling between the asset and the vehicle.

15. The system of claim 14, wherein the first telematics device comprises a first sensor arranged to measure an instantaneous travel parameter relating to the travel environment of the asset and/or the second telematics device comprises a second sensor arranged to measure the same instantaneous travel parameter relating to the travel environment of the vehicle, each travel data point further comprising the instantaneous travel parameter as one of the multiple travel parameters associated with the time stamp.

16. The system of claim 14, wherein each first telematics device comprises a battery as a power source and/or each second telematics device comprises an input for connection to a vehicle power source.

17. The system of claim 14, wherein each second telematics device comprises a buffer arranged to store the vehicle travel data and each second telematics device is configured to periodically transmit a message to the remote server comprising a plurality of travel data points from the stored vehicle travel data.

18. The system of claim 14, wherein, after determining a coupling between the asset and the vehicle, the at least one processor is arranged to determine one of the multiple travel parameters for the asset at a given point in time based on a corresponding one of the multiple travel parameters for the vehicle from a travel data point comprising a time stamp closest to the given point in time, so as to determine a travel path for the asset based on a travel path of the vehicle; and further comprising an output terminal arranged to communicate with the server and display the determined travel path for the asset and the travel path of the vehicle.

* * * * *